United States Patent
Yoshikawa

(10) Patent No.: US 12,402,109 B2
(45) Date of Patent: Aug. 26, 2025

(54) COMMUNICATION APPARATUS AND CONTROL METHOD FOR ENABLING A COMBINATION OF A FREQUENCY BAND AND AN AUTHENTICATION METHOD TO BE APPROPRIATELY SET

(71) Applicant: CANON KABUSHIKI KAISHA, Tokyo (JP)

(72) Inventor: Yuki Yoshikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 350 days.

(21) Appl. No.: 17/845,420

(22) Filed: Jun. 21, 2022

(65) Prior Publication Data
US 2022/0322353 A1    Oct. 6, 2022

Related U.S. Application Data

(63) Continuation of application No. PCT/JP2020/046106, filed on Dec. 10, 2020.

(30) Foreign Application Priority Data

Dec. 24, 2019 (JP) ................................. 2019-233223

(51) Int. Cl.
*H04W 72/04* (2023.01)
*H04W 12/04* (2021.01)
(Continued)

(52) U.S. Cl.
CPC ....... *H04W 72/0453* (2013.01); *H04W 12/04* (2013.01); *H04W 12/06* (2013.01);
(Continued)

(58) Field of Classification Search
CPC . H04W 72/0453; H04W 12/04; H04W 12/06; H04W 12/60; H04W 24/02;
(Continued)

(56) References Cited

U.S. PATENT DOCUMENTS

| 9,887,836 B1 * | 2/2018 | Roth ....................... H04L 9/088 |
| 10,169,587 B1 * | 1/2019 | Nix ...................... H04W 12/041 |

(Continued)

FOREIGN PATENT DOCUMENTS

| CN | 102461329 A | 5/2012 |
| CN | 109302544 A | 2/2019 |

(Continued)

OTHER PUBLICATIONS

Sherlock, WFA Liaison Update, IEEE 802.22-19/1660r0, IEEE, Sep. 2019 (URL: https://mentor.ieee.org/802.11/dcn/19/11-19-1660-00-0000-wfa-liaison-update.pptx).

(Continued)

*Primary Examiner* — Quazi Farooqui
(74) *Attorney, Agent, or Firm* — Canon U.S.A., Inc. IP Division

(57) ABSTRACT

A communication apparatus controls notification means configured to issue a notification to a user, in such a manner as to restrict a combination of selection of a predetermined frequency band as a frequency band to be used in a case where wireless communication complying with an Institute of Electrical and Electronics Engineers (IEEE) 802.11 series standard is executed, and selection of a predetermined authentication method as an authentication method to be used in a case where wireless communication complying with an IEEE 802.11 series standard is executed.

36 Claims, 19 Drawing Sheets

(51) Int. Cl.
  *H04W 12/06* (2021.01)
  *H04W 12/60* (2021.01)
  *H04W 24/02* (2009.01)
  *H04W 72/0453* (2023.01)
  *H04W 84/12* (2009.01)

(52) U.S. Cl.
  CPC ........... *H04W 12/60* (2021.01); *H04W 24/02* (2013.01); *H04W 84/12* (2013.01)

(58) Field of Classification Search
  CPC ..... H04W 84/12; H04W 12/03; H04W 88/08; H04W 12/009; H04W 12/02; H04W 76/10; H04W 88/06; H04W 72/04; H04L 9/0631
  See application file for complete search history.

(56) References Cited

U.S. PATENT DOCUMENTS

| | | | |
|---|---|---|---|
| 10,896,429 B2* | 1/2021 | Wells | G06Q 50/01 |
| 2010/0034120 A1 | 2/2010 | Nakajima | |
| 2014/0177548 A1 | 6/2014 | Aihara | |
| 2017/0048705 A1 | 2/2017 | Fujita | |
| 2017/0142724 A1 | 5/2017 | Mohaupt | |
| 2018/0234840 A1 | 8/2018 | Nakamura | |
| 2019/0037595 A1 | 1/2019 | Cherian | |
| 2019/0357080 A1 | 11/2019 | Shanbhag | |
| 2020/0077258 A1* | 3/2020 | Doyle | H04L 63/0428 |
| 2021/0195622 A1* | 6/2021 | Kim | H04W 72/0453 |
| 2021/0243184 A1* | 8/2021 | La Torre | H04L 63/083 |

FOREIGN PATENT DOCUMENTS

| | | |
|---|---|---|
| CN | 109391281 A | 2/2019 |
| JP | 2011-199458 A | 10/2011 |
| JP | 2013093913 A | 5/2013 |
| JP | 2015048691 A | 3/2015 |
| JP | 2017211729 A | 11/2017 |
| JP | 2019-029689 A | 2/2019 |
| JP | 2019-036776 A | 3/2019 |
| JP | 2019036775 A | 3/2019 |
| JP | 2019-129376 A | 8/2019 |
| KR | 100749720 B1 | 8/2007 |
| KR | 20190011680 A | 2/2019 |

OTHER PUBLICATIONS

Li Deyong, Research and design of security mechanism for WLAN based on WPA / WPA2: A Thesis in Communication and Information Systems, Northeastern University, Jun. 2015.

Lin Hongbo, Wireless Router in the LAN Settings, DIGITCW, State general administration of press and publication, radio and television, Oct. 2015.

* cited by examiner

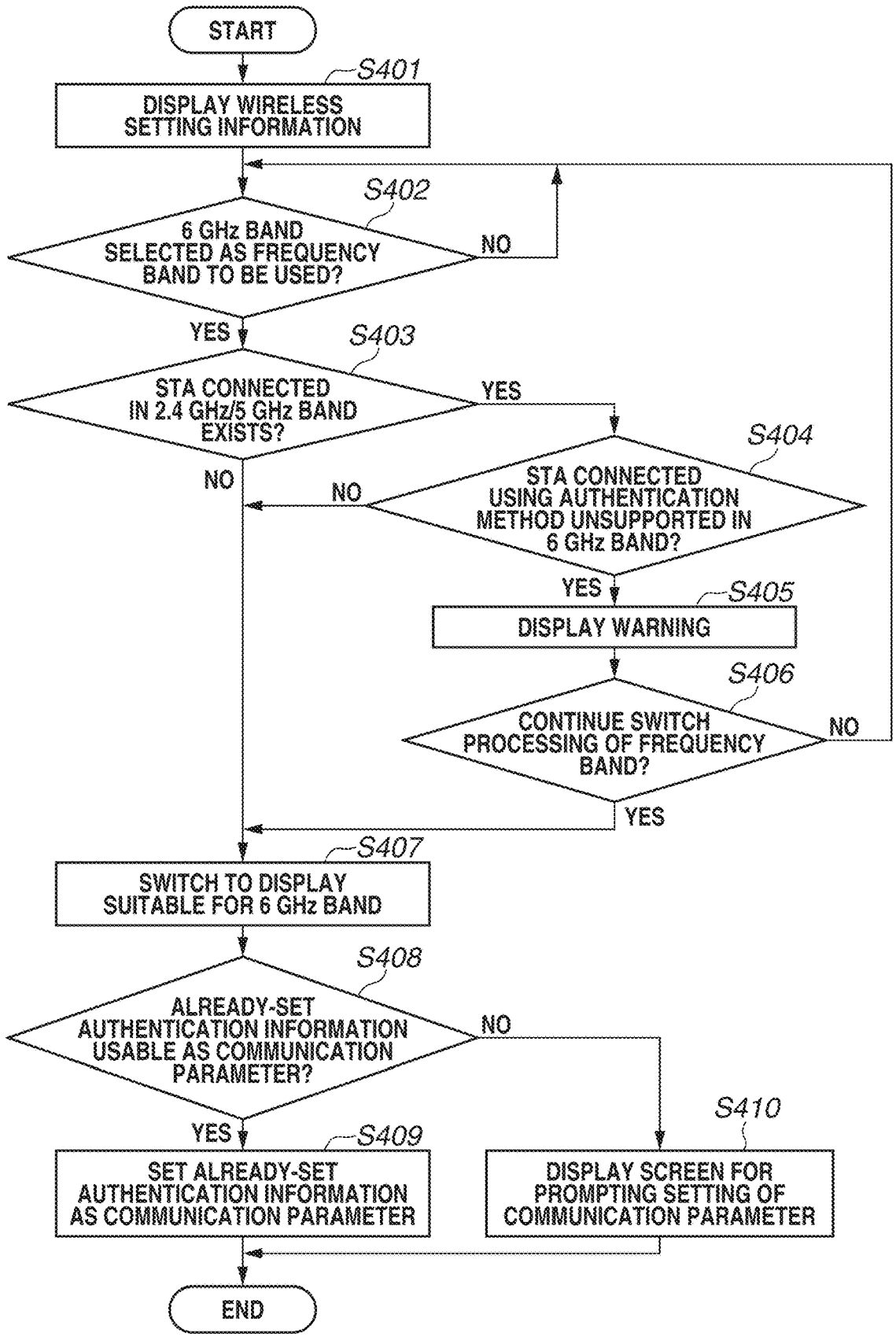

FIG.5

WIRELESS LAN SETTING

WIRELESS LAN ACCESS POINT (BASE UNIT) SETTING

- NETWORK NAME (SSID): Canon-XXXXXX
- WIRELESS OPERATION MODE: 802.11n+g+b (2.4 GHz)
- AUTOMATIC CHANNEL SELECTION: ☑ USE

ENCRYPTION

- ENCRYPTION:
  - OPEN
  - OWE(AES)
  - WPA2-PSK(TKIP/AES)
  - WPA2-PSK(AES)
  - WPA/WPA2-PSK(TKIP/AES)
  - WPA/WPA2-PSK(AES)
  - WPA2-EAP(AES)
  - WPA2-PSK/WPA3-SAE(AES)
  - WPA3-SAE(AES)
  - WPA3-EAP(AES)
  - WPA2/WPA3-EAP(AES)
- CIPHER STRENGTH
- ENCRYPTION KEY

- BASIC SETTING (PLEASE SELECT) »
- ADVANCED SETTING (PLEASE SELECT) »
- MAINTENANCE (PLEASE SELECT) »
- INFORMATION (PLEASE SELECT) »

FIG.6

WIRELESS LAN SETTING

WIRELESS LAN ACCESS POINT (BASE UNIT) SETTING

- NETWORK NAME (SSID): Canon-XXXXXX
- WIRELESS OPERATION MODE: 802.11ax (6 GHz)
- AUTOMATIC CHANNEL SELECTION: ☑ USE

ENCRYPTION

- ENCRYPTION:
  - OWE(AES)
  - WPA3-SAE(AES)
  - WPA3-EAP(AES)
- CIPHER STRENGTH
- ENCRYPTION KEY: **********

- BASIC SETTING (PLEASE SELECT)
- ADVANCED SETTING (PLEASE SELECT)
- MAINTENANCE (PLEASE SELECT)
- INFORMATION (PLEASE SELECT)

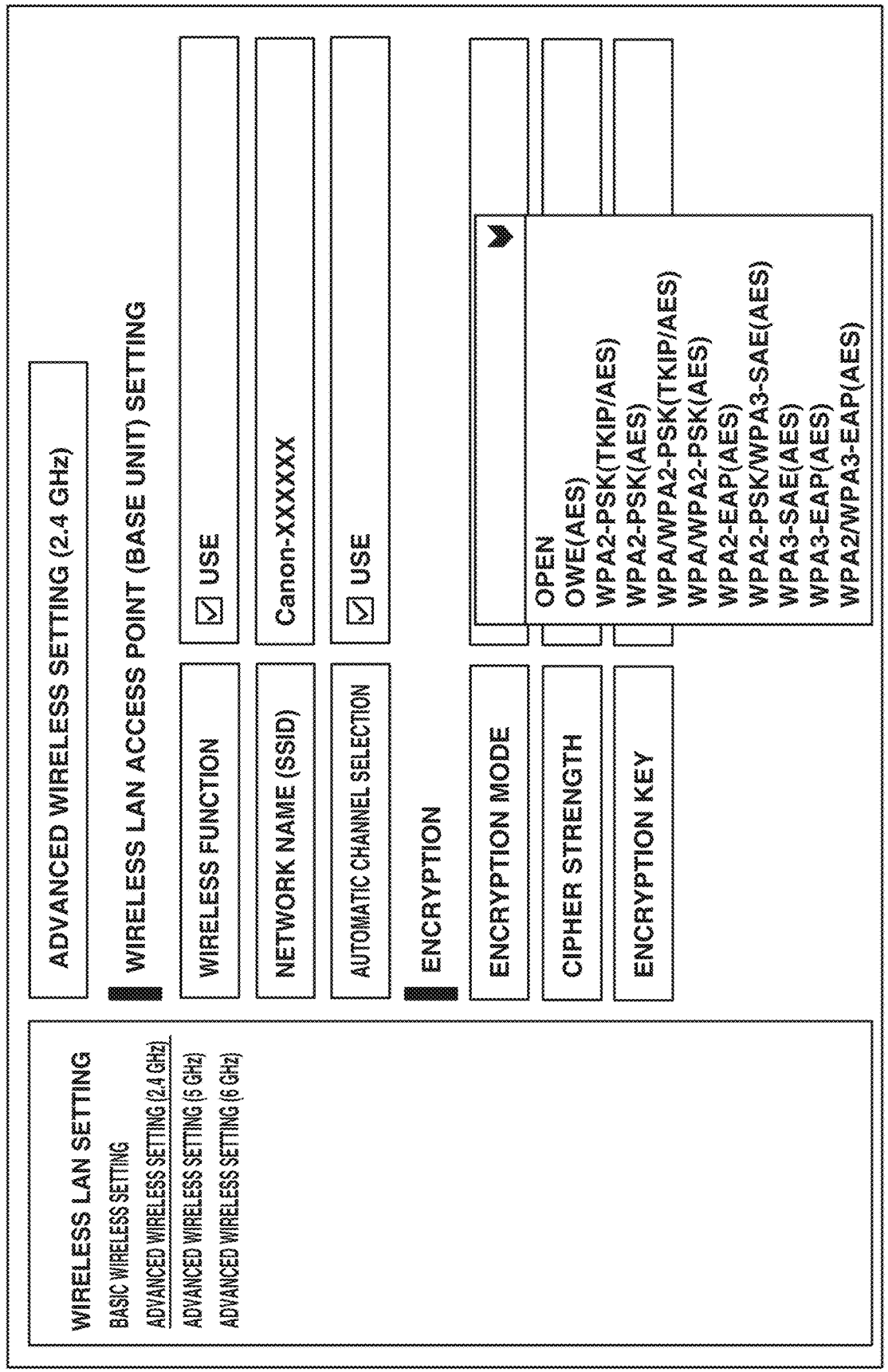

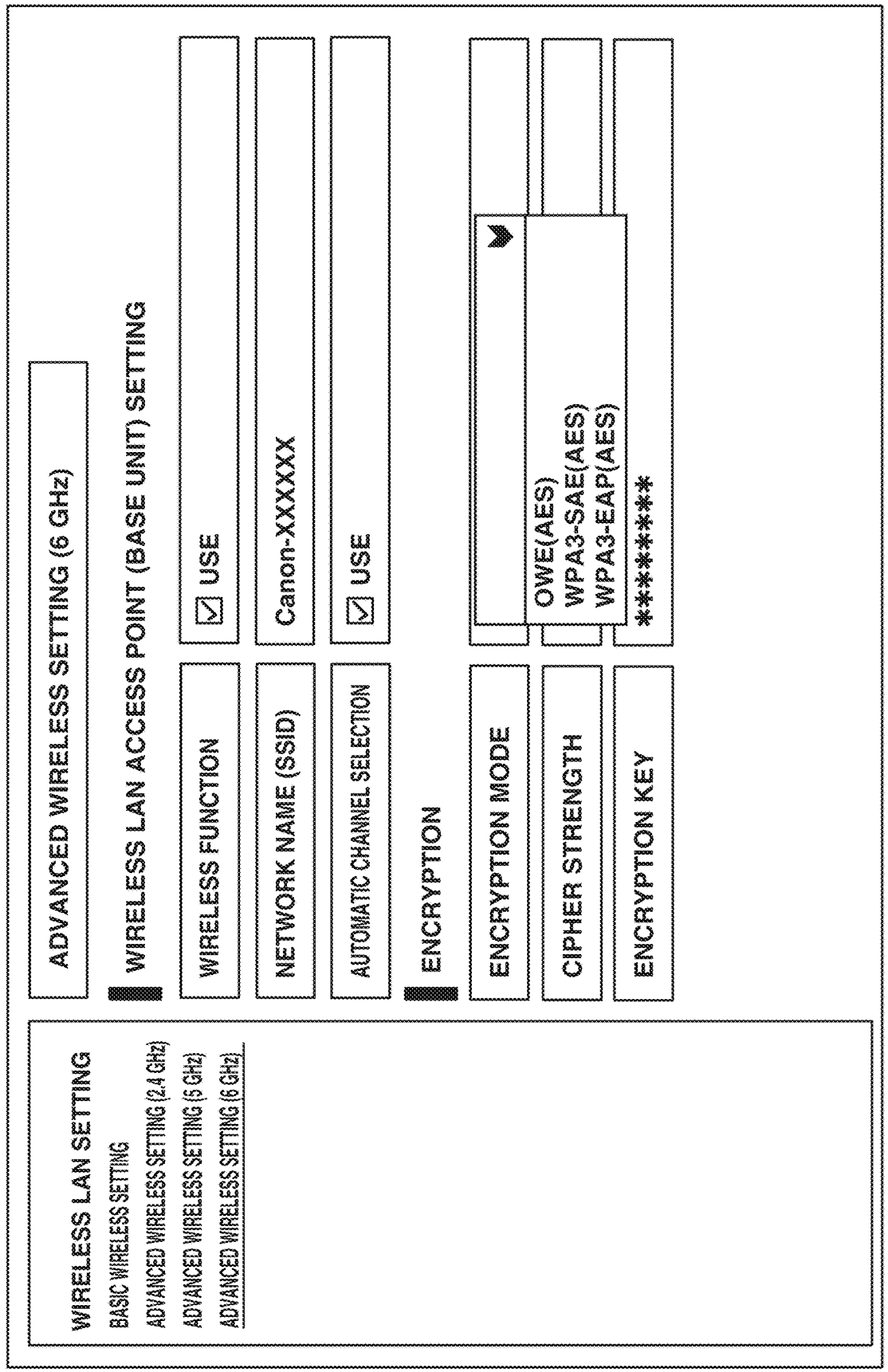

COMMUNICATION APPARATUS AND CONTROL METHOD FOR ENABLING A COMBINATION OF A FREQUENCY BAND AND AN AUTHENTICATION METHOD TO BE APPROPRIATELY SET

CROSS-REFERENCE TO RELATED APPLICATIONS

This application is a Continuation of International Patent Application No. PCT/JP2020/046106, filed Dec. 10, 2020, which claims the benefit of Japanese Patent Application No. 2019-233223, filed Dec. 24, 2019, both of which are hereby incorporated by reference herein in their entirety.

BACKGROUND OF THE INVENTION

Field of the Invention

The present invention relates to a setting of wireless communication.

Background Art

In the case of performing wireless communication, a setting for executing wireless communication (hereinafter, referred to as a communication parameter) is to be set. An access point (AP) having a role of constructing a wireless network constructs a wireless network that uses a frequency channel, an encryption method, and an authentication method that are set as communication parameters. By displaying a setting screen for setting communication parameters of an AP, a user can set communication parameters in the AP.

PTL 1 (listed below) discusses a communication apparatus that controls whether to display a selection screen of internal authentication, depending on whether an authentication method selected as a communication parameter is an authentication method for executing internal authentication.

In an Institute of Electrical and Electronics Engineers (IEEE) 802.11ax standard being a wireless communication standard considered by the IEEE, the use of a 6 gigahertz (GHz) band is considered in addition to conventional 2.4 GHz and 5 GHz bands, as a frequency band to be used in communication. Because encryption methods and authentication methods supported in the conventional communication in the 2.4 GHz and 5 GHz bands have been the same, there has been no need for a user to set communication parameters in consideration of a frequency band. Nevertheless, it is considered that only a part of authentication methods are supported in the communication in the 6 GHz band. In such a case, it is bothersome for the user to appropriately set an authentication method in consideration of usable authentication methods when setting communication parameters for the communication in the 6 GHz band.

CITATION LIST

Patent Literature

PTL1: Japanese Patent Application Laid-Open No. 2011-199458

SUMMARY OF THE INVENTION

The present invention is directed to enabling a combination of a frequency band and an authentication method to be appropriately set.

In view of the foregoing, a communication apparatus according to the present invention includes first selection means for selecting a frequency band to be used in a case where wireless communication complying with an Institute of Electrical and Electronics Engineers (IEEE) 802.11 series standard is executed, second selection means for selecting an authentication method to be used in a case where wireless communication complying with an IEEE 802.11 series standard is executed, and control means for controlling notification means for issuing a notification to a user, in such a manner as to restrict a combination of selection of a predetermined frequency band that is made by the first selection means, and selection of a predetermined authentication method that is made by the second selection means.

Further features of the present invention will become apparent from the following description of exemplary embodiments with reference to the attached drawings.

BRIEF DESCRIPTION OF THE DRAWINGS

FIG. 4 is a flowchart illustrating processing to be executed when the communication apparatus 102 sets a communication parameter.

FIG. 5 is a diagram illustrating an example of a graphical user interface to be displayed by the communication apparatus 102 using a first display method.

FIG. 6 is a diagram illustrating another example of a graphical user interface to be displayed by the communication apparatus 102 using the first display method.

FIG. 7 is a diagram illustrating an example of a graphical user interface to be displayed by the communication apparatus 102 using a second display method.

FIG. 8 is a diagram illustrating another example of a graphical user interface to be displayed by the communication apparatus 102 using the second display method.

DESCRIPTION OF THE EMBODIMENTS

Figure 1:
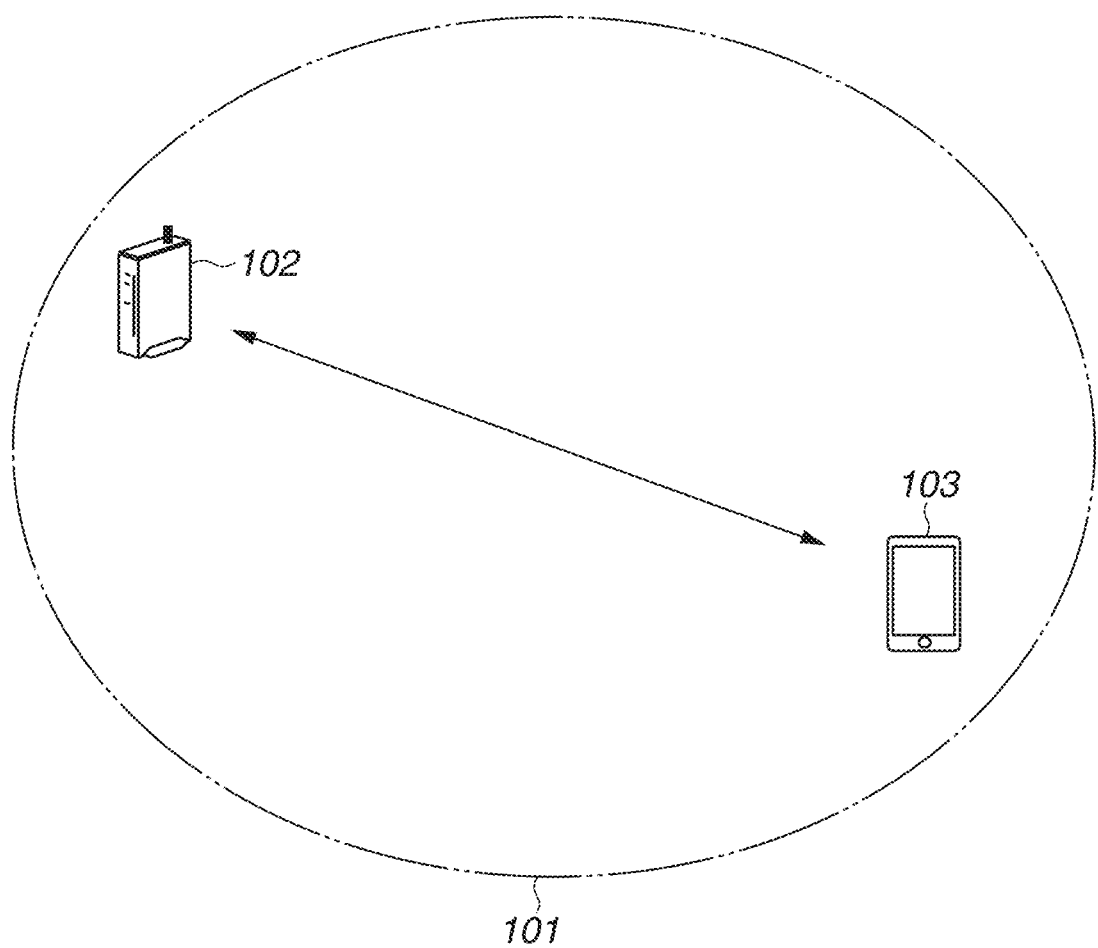
FIG. 1 is a diagram illustrating a configuration of a network in which a communication apparatus 102 participates.

Hereinafter, an exemplary embodiment of the present invention will be described in detail with reference to the attached drawings. The configurations described in the following exemplary embodiment are mere examples, and the present invention is not limited to the configurations illustrated in the drawings.

FIG. 1 illustrates a configuration of a network in which a communication apparatus 102 according to the present exemplary embodiment participates. The communication apparatus 102 is an access point (AP) having a role of constructing a network 101. The network 101 is a wireless network. A communication apparatus 103 is a station (STA) having a role of participating in the network 101. Each communication apparatus complies with an Institute of Electrical and Electronics Engineers (IEEE) 802.11ax standard, and can execute wireless communication complying with the IEEE 802.11ax standard, via the network 101. Each communication apparatus can execute communication in frequency bands of a 2.4 gigahertz (GHz) band, a 5 GHz band, and a 6 GHz band. Frequency bands to be used by each communication apparatus are not limited to these. For example, different frequency bands, such as a 60 GHz band, may be used.

A communication parameter is set in the communication apparatus 102, and the communication apparatus 102 constructs a network in accordance with the set communication parameter. The communication parameter set in the communication apparatus 102 may be a preset communication parameter, or may be a communication parameter set by a user. The user can set the communication parameter of the communication apparatus 102 via a setting screen displayed on a display unit (notification unit, output unit 305) of the communication apparatus 102, or a display unit of a communication apparatus (not illustrated) communicating with the communication apparatus 102 via a cable or wirelessly.

Specifically, the communication parameter set in the communication apparatus 102 is an authentication method. In addition to this, at least one of a service set identifier (SSID), an encryption method, an encryption key, a frequency band, a frequency channel, a bandwidth, whether to use a wireless function, and a network name may also be set as a communication parameter. At least one of various parameters set on setting screens of communication parameters that are illustrated in FIGS. 5 to 19, which will be described below, may be set as a communication parameter.

The SSID is an identifier for identifying an AP (the communication apparatus 102). The encryption method is a method of encrypting communication between an AP (the communication apparatus 102) and an STA (the communication apparatus 103). The encryption key is a key to be used in encrypting communication between an AP (the communication apparatus 102) and an STA (the communication apparatus 103). Only an STA that knows an encryption key set in an AP can communicate with the AP. The frequency band is a frequency band to be used when an AP (the communication apparatus 102) and an STA (the communication apparatus 103) communicate with each other. In the IEEE 802.11ax standard, the frequency band can be selected from the 2.4 GHz band, the 5 GHz band, and the 6 GHz band. The frequency channel is a frequency channel to be used when an AP (the communication apparatus 102) and an STA (the communication apparatus 103) communicate with each other. A frequency channel belonging to a selected frequency band can be selected. For example, in a case where the 2.4 GHz band is selected as a frequency band, any channel of channel (ch) 1 to ch 13 can be selected as a frequency channel. The bandwidth is a bandwidth to be used when an AP (the communication apparatus 102) and an STA (the communication apparatus 103) communicate with each other, and 20 megahertz (MHz), 40 MHz, 80 MHz, or 160 MHz can be selected. In addition, a band broader than 160 MHz may be made selectable. Whether to use a wireless function is a parameter indicating whether to use a wireless function of the communication apparatus 102 serving as an AP. By setting whether to use a wireless function, whether to use a wireless function for performing wireless communication can be set for each frequency band. Alternatively, whether to use a wireless function may be made settable for all wireless communications of the communication apparatus 102. In a case where nonuse of a wireless function is set, the communication apparatus 102 does not construct a network. Alternatively, the communication apparatus 102 does not perform communication via a network constructed by itself. The network name is a name of a network to be constructed by the communication apparatus 102, and can be set using an arbitrary character string. The network name and the SSID may be the same. In this case, only either setting item of them may be set as a communication parameter.

Specific examples of the authentication method include Open, Wi-Fi Protected Access (WPA), WPA2, and WPA3. The Open is an authentication method defined as Open System Authentication in an IEEE 802.11 series standard. In this authentication method, an AP that has received an authentication request from an STA always transmits an authentication success. Because authentication always succeeds in this authentication method, substantive authentication is not performed. The WPA is a standard regarding an authentication method that has been formulated by the Wi-Fi Alliance. The WPA2 is a successor standard of the WPA, and has enhanced security as compared with the WPA, by supporting a new encryption method unsupported by the WPA. The WPA3 is a successor standard of the WPA2, and is a standard having further enhanced security. In the WPA2, a pre-shared key is used as a key for encrypting communication. In the present exemplary embodiment, in a case where the WPA2 is selected as an authentication method, a pre-shared key functions as an encryption key. Normally, a pre-shared key is manually entered to an AP and an STA by the user. Nevertheless, in the WPA3, both of an AP and an STA generate keys by performing calculation using an elliptic curve cryptosystem on passwords entered to both of the AP and the STA, and encrypt communication using the keys instead of encrypting communication using a pre-shared key. Such a key sharing method is called simultaneous authentication of equals (SAE). In the WPA3, a new key is generated each time authentication is performed, and thus the security is enhanced as compared with the WPA2 in which the same pre-shared key is used a plurality of times. In the present exemplary embodiment, in a case where the WPA3 is selected as an authentication method, an encryption key corresponds to a password.

In the present exemplary embodiment, the communication apparatuses 102 and 103 support different authentication methods depending on a frequency band to be used. Specifically, in the 2.4 GHz band and the 5 GHz band, the communication apparatuses 102 and 103 support all of the Open, the WPA, the WPA2, and the WPA3. Whereas in the 6 GHz band, the communication apparatuses 102 and 103 support only the WPA3.

In addition to or instead of the WPA3, the communication apparatuses 102 and 103 may support, as an authentication method, Open that uses a method called Opportunistic Wireless Encryption (OWE), as a key sharing method. While communication has been performed without encryption in the conventional Open, encryption of communication is enabled in the Open that uses the OWE method. The OWE is a key sharing method that uses an elliptic curve cryptosystem similarly to the SAE, but differs in that preliminary password sharing is unnecessary.

Specific examples of an encryption method include a Temporal Key Integrity Protocol (TKIP) and an Advanced Encryption Standard (AES). The AES is an encryption method stronger than the TKIP, and has higher cipher strength.

In the present exemplary embodiment, the communication apparatuses 102 and 103 support different encryption methods depending on a frequency band to be used. Specifically, in the 2.4 GHz band and the 5 GHz band, the communication apparatuses 102 and 103 support both the TKIP and the AES, and in the 6 GHz band, the communication apparatuses 102 and 103 support only the AES. Thus, in a case where communication in the 6 GHz band is performed between the communication apparatuses 102 and 103, the user is to select the WPA3 as an authentication method and select the AES as an encryption method.

In this case, the user may fail to correctly set communication parameters if, for example, the WPA2 is displayed or made selectable as an authentication method on a setting screen of communication parameters even in a case where the user selects the 6 GHz band as a frequency band. Thus, in a case where the 6 GHz band is selected as a frequency band the user can easily set correct communication parameters by changing the display of a setting screen from a setting screen displayed in a case where the 2.4 GHz band and the 5 GHz band are selected. Specifically, only the WPA3 is displayed or made selectable as an authentication method, and only the AES is displayed or made selectable as an encryption method.

In the present exemplary embodiment, the communication apparatuses 102 and 103 are assumed to perform wireless communication complying with the IEEE 802.11ax standard, but the standard is not limited to this. The communication apparatuses 102 and 103 may perform wireless communication complying with an IEEE 802.11be standard, which is a successor standard of the IEEE 802.11ax standard. In the IEEE 802.11be standard, communication can be performed in frequency bands including the 2.4 GHz band, the 5 GHz band, and the 6 GHz band, similarly to the IEEE 802.11ax standard. In this case, similarly to communication complying with the IEEE 802.11ax standard, supported authentication methods and encryption methods may vary depending on a frequency band.

The communication apparatuses 102 and 103 comply with the IEEE 802.11ax standard. In addition to this, the communication apparatuses 102 and 103 may comply with at least any one of legacy standards, which are standards formulated earlier than the IEEE 802.11ax standard. The legacy standards refer to IEEE 802.11a/b/g/n/ac/ax standards. In addition to or instead of the legacy standards, the communication apparatuses 102 and 103 may also comply with a successor standard of the IEEE 802.11ax standard. Specifically, the successor standard is the IEEE 802.11be standard. Alternatively, the communication apparatuses 102 and 103 may comply with a successor standard later than the IEEE 802.11be. In the present exemplary embodiment, at least any one of the IEEE 802.11a/b/g/n/ac/ax/be standards is called an IEEE 802.11 series standard. In addition to the IEEE802.11 series standards, the communication apparatuses 102 and 103 may comply with other communication standards, such as Bluetooth®, near field communication (NFC), ultrawideband (UWB), ZigBee, and multi band OFDM alliance (MBOA). The UWB includes a wireless universal serial bus (USB), wireless 1394, and Winners Information Network (WiNET). The communication apparatuses 102 and 103 may comply with a communication standard of wired communication of a wired, such as a local area network (LAN).

In a case where the communication apparatuses 102 and 103 comply with an IEEE 802.11 series standard, the communication apparatuses 102 and 103 can use at least any one of the 2.4 GHz band, the 5 GHz band, and the 6 GHz band as a frequency band. The communication apparatuses 102 and 103 can execute wireless communication complying with the IEEE 802.11 series standard, via a frequency channel included in a usable frequency band. In this case, the bandwidth of each frequency channel is defined as 20 MHz in the IEEE 802.11 series standard. The communication apparatuses 102 and 103 can also use frequency channels each having a bandwidth larger than or equal to 40 MHz, by bonding adjacent frequency channels. In a case where the communication apparatuses 102 and 103 comply with the IEEE 802.11 series standard, the communication apparatuses 102 and 103 can communicate data using a structure called a distributed coordination function (DCF). In the DCF, a data transmission apparatus withholds data transmission for a random time called a backoff to avoid collision of data with another communication apparatus. After the lapse of the random time (backoff), the data transmission apparatus confirms whether a frequency channel to be used for data transmission is not used by the other apparatus, and then performs data transmission. The communication apparatuses 102 and 103 may be able to execute communication control using enhanced distributed channel access (EDCA) instead of or in addition to the DCF. In the EDCA, pieces of data to be transmitted are classified by priority, and a different backoff is set for each priority. Specifically, a short backoff is set for data with a high priority as compared with data with a low priority.

The communication apparatuses 102 and 103 complying with the IEEE 802.11 series standard may support a method by which an AP intensively manages data communication performed by an STA, in addition to or instead of the DCF. For example, the communication apparatuses 102 and 103 may support a data communication method using a point coordination function (PCF). In the PCF, one apparatus (AP) sequentially transmits a polling signal to a plurality of other apparatuses, and only apparatuses that have received the polling signal from the AP can transmit data. Because only apparatuses to which the AP has transmitted a polling signal can transmit data until the next polling signal is transmitted, collision of data does not occur. Alternatively, the communication apparatuses 102 and 103 may be capable of executing communication control using hybrid coordination function controlled channel access (HCCA). The HCCA is a communication method that can perform negotiation of communication quality between the AP and the other apparatus in addition to data communication control by performing polling by an AP as in the PCF. In the HCCA, scheduling that considers a priority of data can be performed. In addition, a method of avoiding a collision of data to be communicated by STAs, by an AP intensively managing data communication performed by STAs is not limited to the method that uses the PCF or the HCCA.

Alternatively, the communication apparatuses 102 and 103 complying with the IEEE 802.11 series standard may support a data communication method that uses request to send (RTS)/clear to send (CTS), for example. In this method, in a case where an STA has data to be transmitted, the STA first transmits RTS to an AP. The AP that has received the RTS transmits CTS to the STA in response to the RTS. The STA that has received the CTS transmits the data to the AP. In this case, the RTS, the CTS, and the data each include a network allocation vector (NAV) indicating a time for which a channel to be used in transmission is occupied. Because the other terminal that has detected RTS, CTS, and data does not transit a signal for a period indicated by the NAV, collision of data can be avoided.

Specific examples of the communication apparatus 102 include a wireless LAN router, and a personal computer (PC), but the communication apparatus 102 is not limited to these. The communication apparatus 102 may be any communication apparatus as long as the communication apparatus can execute wireless communication complying with the IEEE 802.11ax standard, with the other communication apparatus. Specific examples of the communication apparatus 103 include a camera, a tablet, a smartphone, a PC, a mobile phone, and a video camera, but the communication apparatus 103 is not limited to these. The communication apparatuses 103 is only required to be a communication apparatus that can execute wireless communication complying with the IEEE 802.11ax standard, with the other communication apparatus. The network illustrated in FIG. 1 is a network including one AP and one STA, but the number of APs and the number of STAs are not limited to these.

Figure 2:
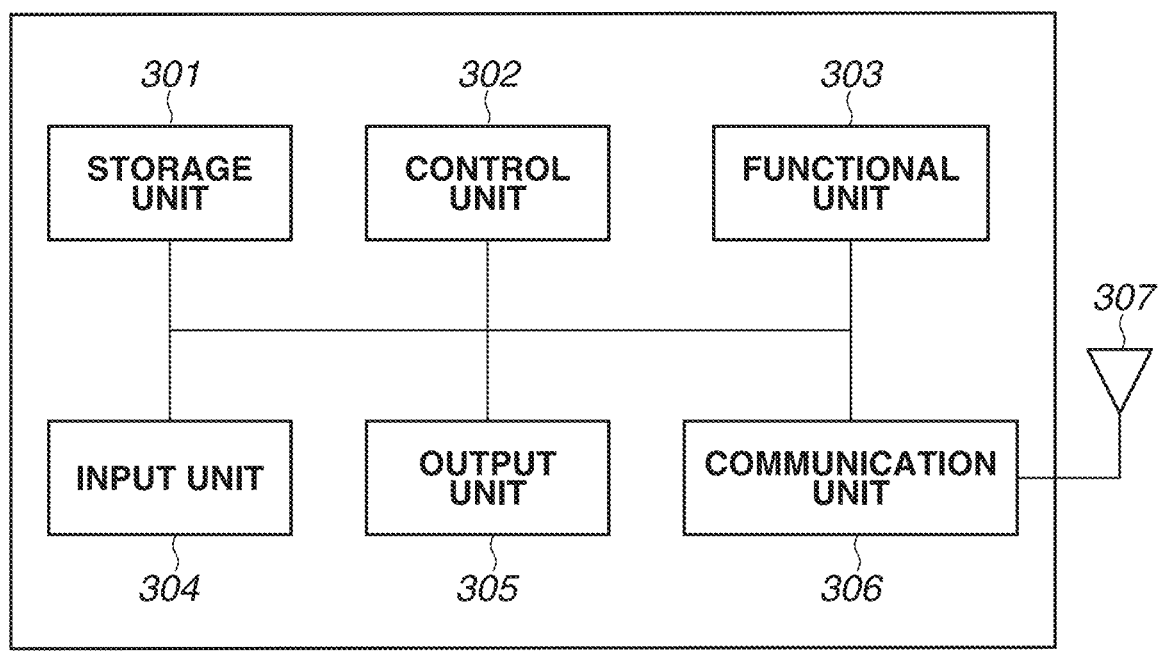
FIG. 2 is a diagram illustrating a hardware configuration of the communication apparatus 102.

FIG. 2 illustrates a hardware configuration of the communication apparatus 102 according to the present exemplary embodiment. The communication apparatus 102 includes a storage unit 301, a control unit 302, a functional unit 303, an input unit 304, an output unit 305, a communication unit 306, and an antenna 307.

The storage unit 301 includes one or more memories, such as a read only memory (ROM) and a random access memory (RAM), and stores computer programs for performing various operations described below, and various types of information, such as communication parameters for wireless communication. Aside from memories such as a ROM and a RAM, a storage medium may be used as the storage unit 301, such as a flexible disk, a hard disk, an optical disk, a magneto-optical disk, a compact disk read only memory (CD-ROM), a CD recordable (CD-R), a magnetic tape, a nonvolatile memory card, or a digital versatile disk (DVD). The storage unit 301 may include a plurality of memories.

The control unit 302 includes one or more processors, such as a central processing unit (CPU) and a micro processing unit (MPU). By executing computer programs stored in the storage unit 301, the control unit 302 controls the entire communication apparatus 102. The control unit 302 may control the entire communication apparatus 102 in cooperation with computer programs stored in the storage unit 301, and an operating system (OS). The control unit 302 also generates data and signals (wireless frames) to be transmitted in the communication with another communication apparatus. The control unit 302 may include a plurality of processors such as multi-core processors, and control the entire communication apparatus 102 using the plurality of processors.

The control unit 302 also executes predetermined processing, such as wireless communication, image capturing, printing, and projection, by controlling the functional unit 303. The functional unit 303 is hardware for the communication apparatus 102 executing predetermined processing.

The input unit 304 receives various operations from the user. The output unit 305 performs various outputs to the user via a monitor screen or a speaker. The output unit 305 may operate as a display unit that performs screen display, or a notification unit that issues various notifications to the user. The output performed by the output unit 305 may be display on the monitor screen, voice output by the speaker, or vibration output. Both the input unit 304 and the output unit 305 may be implemented by one module like a touch panel. The input unit 304 and the output unit 305 may be each formed integrally with the communication apparatus 102, may be each formed separately from the communication apparatus 102, or may be devices connected with the communication apparatus 102 wirelessly or via a cable. Alternatively, the output unit 305 may operate as a display control unit that causes a display unit of another communication apparatus communicating with the communication apparatus 102 by wireless communication or wired communication, to execute screen display. Alternatively, the output unit 305 may operate as an output control unit that causes an output unit, such as a speaker, of the other communication apparatus, in addition to or instead of a screen, to execute voice output. The input unit 304 may receive inputs performed by the user via another communication apparatus communicating with the communication apparatus 102 by wireless communication or wired communication.

The communication unit 306 controls wireless communication complying with the IEEE 802.11ax standard. The communication unit 306 may control wireless communication complying with other IEEE 802.11 series standards in addition to the IEEE 802.11ax standard, or may control wired communication of a wired LAN or the like. The communication unit 306 controls the antenna 307 to transmit and receive signals for wireless communication that have been generated by the control unit 302. In a case where the communication apparatus 102 complies with an NFC standard, a Bluetooth® standard, and the like in addition to the IEEE 802.11ax standard, the communication unit 306 may control wireless communication complying with these communication standards. In a case where the communication apparatus 102 can execute wireless communication complying with a plurality of communication standards, communication units and antennas that correspond to the respective communication standards may be individually included. The communication apparatus 102 communicates data, such as image data, document data, and video data, with the communication apparatus 103 via the communication unit 306. The antenna 307 may be formed separately from the communication unit 306, or may be formed as one module together with the communication unit 306.

The antenna 307 is an antenna that can execute communication in the 2.4 GHz band, the 5 GHz band, and the 6 GHz band. In the present exemplary embodiment, the antenna 307 of the communication apparatus 102 is only required to be capable of executing communication at least in the 6 GHz band. In the present exemplary embodiment, the communication apparatus 102 includes one antenna, but may include separate antennas for the respective frequency bands. In a case where the communication apparatus 102 includes a plurality of antennas, the communication apparatus 102 may include communication units 306 corresponding to the respective antennas.

The communication apparatus 103 has a hardware configuration similar to the communication apparatus 102.

Figure 3:
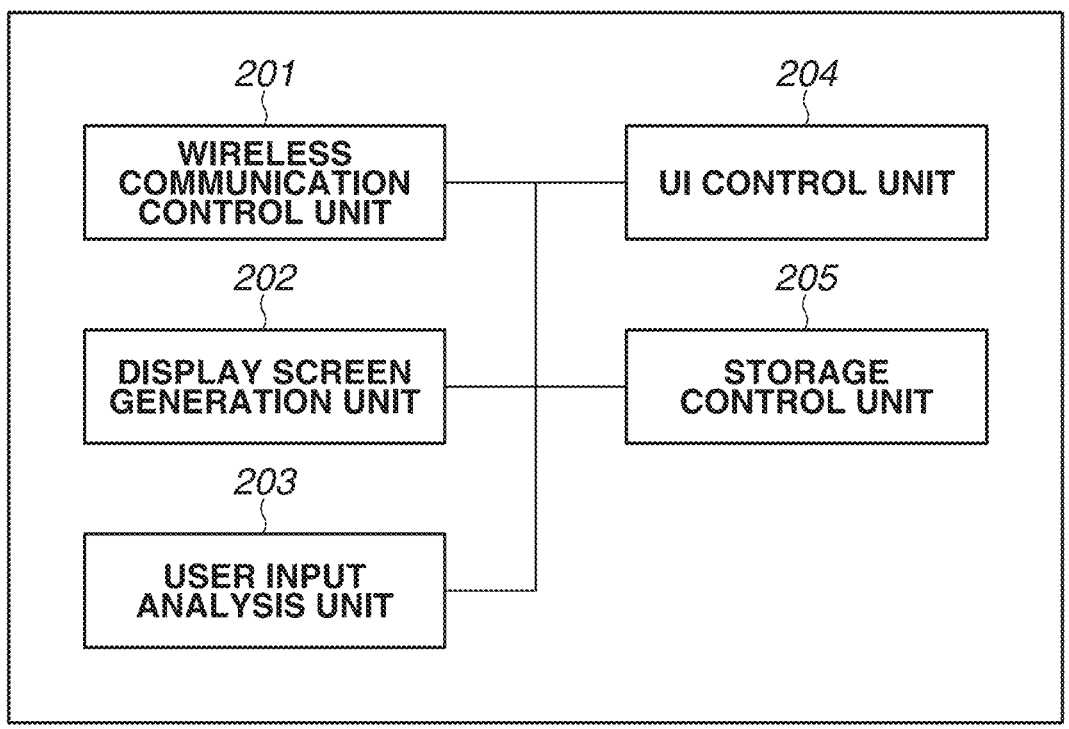
FIG. 3 is a diagram illustrating a functional configuration of the communication apparatus 102.

FIG. 3 is a diagram illustrating a functional configuration of the communication apparatus 102. The communication apparatus 102 includes a wireless communication control unit 201, a display screen generation unit 202, a user input analysis unit 203, a user interface (UI) control unit 204, and a storage control unit 205.

The wireless communication control unit 201 includes a circuit for transmitting and receiving a wireless signal to and from another communication apparatus, and a program for controlling the circuit. The wireless communication control unit 201 controls wireless communication in accordance with the IEEE 802.11 series standard. The wireless communication control unit 201 controls the transmission and reception of wireless signals with another communication apparatus in the 2.4 GHz band, the 5 GHz band, and the 6 GHz band. In the present exemplary embodiment, the communication apparatus 102 includes one wireless communication control unit, but the number of wireless communication control units is not limited to this. The communication apparatus 102 may include wireless communication control units corresponding to the respective supported frequency bands.

The display screen generation unit 202 generates content to be displayed on a user interface (UI), based on information acquired from the user input analysis unit 203 to be described below, and information stored in the storage unit 301, and transmits the generated content to the UI control unit 204 to be described below. For example, in a case where the user input analysis unit 203 to be described below detects that the user has issued an instruction to display a setting screen of communication parameters, the display screen generation unit 202 generates a setting screen of communication parameters, and transmits the setting screen to the UI control unit 204. The screen to be generated by the display screen generation unit 202 can vary depending on a user input or a lapse of time.

The user input analysis unit 203 acquires information obtained by the UI control unit 204 to be described below, and analyzes content designated by the user. For example, the user input analysis unit 203 analyzes content controlled by the wireless communication control unit 201, and extracts information to be displayed on a screen generated by the display screen generation unit 202, in accordance with an instruction input by the user. The user input analysis unit 203 transmits the extracted information to the display screen generation unit 202.

The UI control unit 204 includes a program for controlling hardware (input unit 304) related to a user interface, such as a touch panel or a button for receiving user operations performed on the communication apparatus 102. By using the program of the UI control unit 204, the UI control unit 204 transmits content input by the user that has been obtained from the input unit 304 illustrated in FIG. 2, to the user input analysis unit 203. The UI control unit 204 also transmits an image generated by the display screen generation unit 202, to the output unit 305 illustrated in FIG. 2. The UI control unit 204 also has, for example, a function for presenting information obtained by voice output or the like to the user via the output unit 305.

The storage control unit 205 controls data writing or readout into or from the storage unit 301 storing data and programs operating in the communication apparatus 102.

FIG. 4 is a flowchart illustrating processing to be executed by the communication apparatus 102 by loading a computer program stored in the storage unit 301 onto the control unit 302 when setting a communication parameter, and executing the computer program.

The communication apparatus 102 starts the processing of this flowchart in a case where the user issues an instruction to display a setting screen of communication parameters. An instruction from the user may be issued directly to the input unit 304 of the communication apparatus 102, or may be issued from another communication apparatus connected to the communication apparatus 102 wirelessly or via a cable. The other communication apparatus connected to the communication apparatus 102 wirelessly or via a cable may issue an instruction to display the setting screen, by entering an internet protocol (IP) address of the communication apparatus 102 into an address bar of a browser. Alternatively, the communication apparatus 102 may start the processing of this flowchart based on the fact that the communication apparatus 102 is connected with another communication apparatus via a cable or wirelessly for the first time since factory shipment. Alternatively, the communication apparatus 102 may start the processing of this flowchart based on the fact that the power is turned on for the first time since factory shipment.

First of all, in step S401, the communication apparatus 102 displays a setting screen of communication parameters. The setting screen may be displayed on a display unit (notification unit) of the communication apparatus 102, or may be displayed on a display unit of another communication apparatus (the communication apparatus 103) communicating with the communication apparatus 102 via a cable or wirelessly. The setting screen displayed in this step will be described with reference to FIGS. 5 to 19 to be described below.

In step S402, the communication apparatus 102 determines whether the 6 GHz band has been selected in an item for setting a frequency band that is included in the displayed setting screen. In a case where the 6 GHz band has been selected as a frequency band to be used, the communication apparatus 102 determines Yes in this step. In a case where a different frequency band (the 2.4 GHz band or the 5 GHz band) has been selected, the communication apparatus 102 determines No in this step. A frequency channel may be used in the determination in this step. Specifically, the communication apparatus 102 may determine whether a frequency channel belonging to the 6 GHz band has been selected in an item for setting a frequency channel that is included in the displayed setting screen. In this case, in a case where a frequency channel selected as a frequency channel to be used is a frequency channel belonging to the 6 GHz band, the communication apparatus 102 determines Yes in this step. In contrast, in a case where a frequency channel selected as a frequency channel to be used is a frequency channel belonging to another frequency band (the 2.4 GHz band or the 5 GHz band), the communication apparatus 102 determines No in this step. In a case where No is determined in this step, the communication apparatus 102 performs the determination in this step again. In this case, the display of items on the setting screen does not switch to the display used for the 6 GHz band. In a case where the communication apparatus 102 determines Yes in this step, the communication apparatus 102 performs processing in step S403.

In step S403, the communication apparatus 102 checks whether an STA currently connected in the 2.4 GHz band or the 5 GHz band exists. In a case where an STA connected in at least one of the 2.4 GHz band or the 5 GHz band does not exist, the communication apparatus 102 determines No in this step, and performs processing in step S407. In contrast, in a case where an STA connected in at least one of the 2.4 GHz band or the 5 GHz band exists, the communication apparatus 102 determines Yes in this step, and performs processing in step S404.

In step S404, the communication apparatus 102 determines whether the STA connected in at least one of the 2.4 GHz band or the 5 GHz band is connected using an authentication method unsupported in the 6 GHz band. In the present exemplary embodiment, the authentication method unsupported in the 6 GHz band is the WPA2 or an authentication method earlier than the WPA2. Specifically, the authentication method is the WPA2, the WPA, or the Open that does not use the OWE method. In a case where the communication apparatus 102 communicates with the STA using any of these authentication methods, the STA might be incompatible with the WPA3, and there is a possibility that the communication apparatus 102 becomes incapable of performing communication with the STA if the frequency band is changed to the 6 GHz band. While an AP issues a notification including an authentication method supported by itself, using a Beacon or a Probe Response, an STA does not issue such a notification. An STA merely transmits a request for an authentication method to be used in connection, when transmitting an Association Request to an AP. Thus, the AP cannot identify whether an STA is compatible with another authentication method different from the authentication method requested by the STA using the Association Request. In other words, because the AP cannot identify whether the STA supports the WPA3, the AP cannot recognize whether communication with the STA is executable if the frequency band is changed to the 6 GHz band. In a case where the communication apparatus 102 connects with the STA using the WPA3, the communication apparatus 102 determines No in this step, and performs processing in step S407. In contrast, in a case where the communication apparatus 102 connects with the STA using the WPA2 or an authentication method earlier than the WPA2, the communication apparatus 102 determines Yes in this step, and performs display in step S405. In a case where the communication apparatus 102 connects with the STA using the Open that uses the OWE method, the communication apparatus 102 may determine Yes in this step.

In a case where the communication apparatus 102 determines No in step S404, the communication apparatus 102 may check, before performing the processing in step S407, whether an encryption method used in the connection with the STA is an encryption method unsupported in the 6 GHz band. Specifically, the communication apparatus 102 may check whether an encryption method used in the connection with the STA is an encryption method having cipher strength lower than that of the AES. In a case where an encryption method used in the connection with the STA is an encryption method such as the TKIP that has cipher strength lower than that of the AES, the communication apparatus 102 performs the processing in step S405. In contrast, in a case where an encryption method used in the connection with the STA is an encryption method having cipher strength higher than or equal to that of the AES, the communication apparatus 102 performs the processing in step S407.

In a case where the communication apparatus 102 can simultaneously maintain networks in a plurality of frequency bands, the processing in step S404 may be omitted. This is because, in this case, the communication apparatus 102 can newly establish a network in the 6 GHz band while continuing connection with the STA.

In step S405, the communication apparatus 102 displays a warning to the user. The warning displayed in this step is a warning indicating that, in a case where the frequency band is changed to the 6 GHz band, connection with a currently-connected STA might be disconnected, and reconnection might become inexecutable. The communication apparatus 102 may perform processing, such as output of beep sound and lighting-up of a lamp, together with the display of the warning. By performing the display, it becomes possible for the user to recognize that connection with a currently-connected STA might remain disconnected if the frequency band is switched. The user can thereby stop a switch operation of a frequency band. Together with the warning, the communication apparatus 102 also displays a selection screen for prompting the user to select whether to continue switch processing of a frequency band.

In step S406, the communication apparatus 102 determines whether to continue switch processing of a frequency band. Specifically, the communication apparatus 102 determines whether the user has selected the continuance of switch processing of a frequency band on the selection screen displayed in step S405. In a case where the user has selected the continuance of switch processing, the communication apparatus 102 determines Yes in this step, and performs the processing in step S407. In contrast, in a case where the user has selected discontinuation or an end of the switch processing, the communication apparatus 102 determines No in this step, and performs the processing in step S402 again. Alternatively, the communication apparatus 102 may display the selection screen in step S405, and determine No in this step based on the fact that a predetermined time has lapsed In step S407, the communication apparatus 102 switches the display of a setting screen to the display used for the 6 GHz band. Specifically, the communication apparatus 102 switches the display in such a manner that only the WPA3 is displayed as an authentication method. Alternatively, the communication apparatus 102 switches the display in such a manner that only the WPA3 is selectable as an authentication method. The communication apparatus 102 may display the Open that uses the OWE method, or display the Open in a selectable state, in addition to the WPA3. The communication apparatus 102 also switches the display in such a manner that only the AES is displayed or only the AES is selectable as an encryption method. In this case, authentication methods other than the WPA3 (Open that does not use the OWE method, WPA, WPA2) are hidden or displayed in a grayout state or a shaded state in such a manner as to be unselectable. Displaying an option in the grayout state means displaying the option in an unselectable state, and typically refers to displaying the option in light gray. An encryption method (TKIP) other than the AES is also hidden or displayed in a grayout state or a shaded state in such a manner as to be unselectable. The communication apparatus 102 may notify the user at least either that the WPA and the WPA2 cannot be used as authentication methods, or that the TKIP cannot be used as an encryption method, in a case where the display of a setting screen is switched to the display used for the 6 GHz band.

In step S408, the communication apparatus 102 determines whether already-set authentication information is usable as a communication parameter in the 6 GHz band. Specifically, the communication apparatus 102 determines, for example, whether a pre-shared key in the WPA2 is usable as a password in the WPA3. In a case where a pre-shared key is permitted to be used as a password, the communication apparatus 102 determines Yes in this step, and performs processing in step S409. In contrast, in a case where a pre-shared key is not permitted to be used as a password, the communication apparatus 102 determines No in this step, and performs processing in step S410. Whether a pre-shared key in the WPA or the WPA2 may be used as a password in the WPA3 is set by the user in the communication apparatus 102. Alternatively, whether a pre-shared key in the WPA or the WPA2 may be used as a password in the WPA3 is preset in the communication apparatus 102. Alternatively, the communication apparatus 102 may perform the determination in this step based on whether the number of characters of a character string set as a pre-shared key in the WPA or the WPA2 is larger than or equal to a predetermined number of characters required as a password in the WPA3. In a case where the number of characters of the pre-shared key is larger than or equal to the predetermined number of characters, the communication apparatus 102 determines Yes in this step. In a case where the number of characters of the pre-shared key is smaller than the predetermined number of characters, the communication apparatus 102 determines No in this step.

In a case where the communication apparatus 102 determines Yes in step S408, in step S409, the communication apparatus 102 sets an already-set authentication information as a communication parameter for the communication in the 6 GHz band. Specifically, the communication apparatus 102 sets a pre-shared key in the WPA or the WPA2 as a password in the WPA3. The pre-shared key in the WPA or the WPA2 may be automatically entered into an entry field of a password in the WPA3 that is provided on the setting screen. Even in a case where the processing in step S409 has been performed, a change of the password may be received from the user.

Alternatively, in a case where the communication apparatus 102 determines No in step S408, in step S410, the communication apparatus 102 displays a screen for prompting the user to set a communication parameter in the 6 GHz band. Specifically, the communication apparatus 102 displays a dialog box or a comment for prompting the user to enter a password in the WPA3. In a case where the setting screen includes a common entry field to be used as an entry field of a pre-shared key in the WPA or the WPA2 and an entry field of a password in the WPA3, the entry field is left blank in the setting screen.

As described above, the user can easily select a correct communication parameter by switching a setting screen of communication parameters based on a selected frequency band and an authentication method used in the connection with a currently-connected STA, as illustrated in FIG. 4. The user can also be notified of an error that can be caused by the switch of a frequency band to the 6 GHz band.

In the flowchart illustrated in FIG. 4, the communication apparatus 102 determines whether an STA already connected in the 2.4 GHz band or the 5 GHz band exists after the 6 GHz band is selected as a frequency band to be used, but the processing flow is not limited to this. In a case where the 6 GHz band is selected by the user as a frequency band to be used (in a case where Yes is determined in step S402), the communication apparatus 102 may skip the processing in steps S403 to S406, and perform the processing in step S407. Alternatively, it may be made settable by the user whether the communication apparatus 102 determines whether an STA already connected in the 2.4 GHz band or the 5 GHz band exists, or switches the display of a setting screen, in a case where Yes is determined in step S402. In other words, it may be made settable by the user whether the communication apparatus 102 performs the processing in step S404 or performs the processing in step S407, in a case where Yes is determined in step S402.

In the present exemplary embodiment, the communication apparatus 102 switches at least one of an authentication method and an encryption method to be displayed, in accordance with a selected frequency band, but the processing flow is not limited to this. The communication apparatus 102 may switch a frequency band to be displayed, in accordance with a selected authentication method. Alternatively, the communication apparatus 102 may switch a frequency band to be displayed, in accordance with a selected encryption method. For example, in a case where the WPA2 is selected by the user as an authentication method, the 6 GHz band may be hidden or displayed in an unselectable state as an option of a setting item of a frequency band. In other words, the communication apparatus 102 may switch the display of a setting item of a frequency band, in a case where an authentication method or an encryption method unsupported in the 6 GHz band is selected. In this case, the 2.4 GHz band and the 5 GHz band are displayed or displayed in a selectable state.

In the present exemplary embodiment, the communication apparatus 102 prevents the user from selecting an authentication method or an encryption method unsupported in a selected frequency band, by switching at least one of an authentication method and an encryption method to be displayed, in accordance with the selected frequency band. Nevertheless, the configuration is not limited to this. The communication apparatus 102 may notify the user that a selected authentication method or an encryption method is unsupported when the user tries to set the authentication method or the encryption method unsupported in a frequency band selected by the user. For example, the communication apparatus 102 may display an error indicating that communication is inexecutable on a setting screen of communication parameters, in a case where the user selects the 6 GHz band as a frequency band to be used, and further selects the WPA2 as an authentication method to be used. The communication apparatus 102 may issue a notification in accordance with the user selecting a setting item of an authentication method or an encryption method, or may issue a notification in response to a setting completion instruction of a communication parameter being issued by the user.

From FIG. 5, an example of a setting screen of communication parameters is illustrated that is to be displayed by the communication apparatus 102 according to the present exemplary embodiment. As display methods, six patterns corresponding to the first to sixth display methods.

FIGS. 5 and 6 each illustrate an example of a graphical user interface (GUI) to be displayed by the communication apparatus 102 as a setting screen in the first display method. On the setting screen in the first display method, an item for setting a frequency band, and an item for setting an authentication method and an encryption method are displayed on the same screen. FIG. 5 illustrates an example of a setting screen to be displayed in a case where the 2.4 GHz band is selected as a frequency band to be used. FIG. 6 illustrates an example of a setting screen to be displayed in a case where the 6 GHz band is selected as a frequency band to be used.

As illustrated in FIGS. 5 and 6, a network name of a network to be constructed by the communication apparatus 102, a wireless operation mode, and whether to use automatic channel selection are displayed on the setting screen as items settable as communication parameters. In addition to these items, an encryption method, cipher strength, and an encryption key are also displayed as items settable as communication parameters.

The network name is an item for setting an SSID. The SSID originally functions as an identifier for identifying the communication apparatus 102. In the case of FIGS. 5 and 6, the SSID is also used as a network name of a network to be constructed by the communication apparatus 102.

The wireless operation mode is an item for setting a frequency band of a network to be constructed by the communication apparatus 102. In the first display method, the 2.4 GHz band is expressed as 802.11n+g+b and the 5 GHz band is expressed as 802.11ac+n+g+a, as expressions expressing frequency bands. The 6 GHz band is expressed as 802.11ax, but the expression is not limited to this. For example, symbols or blank such as "/", "●", or " " may be used instead of "+". Alternatively, the respective frequency bands may be simply expressed as the 2.4 GHz band, the 5 GHz band, and the 6 GHz band. Alternatively, the 2.4 GHz band may be expressed as Wi-Fi 4, the 5 GHz band may be expressed as Wi-Fi 5+4, and the 6 GHz band may be expressed as Wi-Fi 6. The Wi-Fi 6 is a name of an authentication program of interconnection between communication apparatuses complying with the IEEE 802.11ax standard that has been formulated by the Wi-Fi Alliance. The Wi-Fi 4 and the Wi-Fi 5 indicate the names of authentication programs of the IEEE 802.11n standard and the IEEE 802.11ac standard, respectively. In the present exemplary embodiment, the setting screen includes an item for setting a frequency band, but the setting screen may include an item for setting a frequency channel, instead of the item. In this case, the user selects a frequency channel to be set, from frequency channels of the 2.4 GHz band, the 5 GHz band, or the 6 GHz band.

In the determination in step S402 of FIG. 4, the communication apparatus 102 performs the determination based on an option set in a wireless operation mode. In a case where an option corresponding to the 6 GHz band is selected in the wireless operation mode, the communication apparatus 102 determines Yes in step S402.

Whether to use automatic channel selection is a setting item for setting whether the communication apparatus 102 automatically selects a frequency channel to be used in the set frequency band. In a case where nonuse of automatic channel selection is selected in this setting item, a setting item for setting a frequency channel may be displayed instead of or in addition to this item.

The encryption is a setting item for setting an encryption method and an authentication method. In the first display method, an encryption method and an authentication method are collectively set using one setting item. In the present exemplary embodiment, options of encryption methods and authentication methods include Open, OWE (AES), WPA2-pre-shared key (PSK) (TKIP/AES), WPA2-PSK (AES), and WPA/WPA2-PSK (TKIP/AES). In addition to these options, WPA/WPA2-PSK (TKIP/AES), WPA/WPA2-PSK (AES), WPA2-Extensible Authentication Protocol (EAP) (AES), and WPA2-PSK/WPA3-SAE (AES) are also included as options. In addition to these options, WPA3-SAE (AES), WPA3-EAP (AES), and WPA2/WPA3-EAP (AES) are further included as options. The OWE indicates the Open that uses the OWE as a key sharing method. This option may be expressed as Open (AES) instead of OWE (AES). The TKIP/AES indicates that the TKIP may be used as an encryption method or the AES may be used as an encryption method. Similarly, the WPA/WPA2-PSK indicates that the WPA-PSK may be used as an authentication method or the WPA2-PSK may be used as an authentication method. Similarly, the WPA2-PSK/WPA3-SAE indicates that the WPA2-PSK may be used as an authentication method or the WPA3-SAE may be used as an authentication method. In this manner, encryption methods or authentication methods described side by side using "/" indicate that either of them may be used. The PSK indicates an authentication method that uses a key sharing method that uses a pre-shared key. The EAP indicates an authentication method that uses an authentication server supporting the IEEE 802.1X standard. The authentication method may be expressed as Enterprise instead of EAP. Such an authentication server is not required in the PSK. The SAE may be alternatively expressed as Personal.

In a case where whichever of the WPA and the WPA2 may be used as an authentication method like the WPA/WPA2-PSK, the option may be described as MIX or WPA2 MIX. Similarly, in a case where whichever of the WPA2 and the WPA3 may be used as an authentication method, the option may be described as MIX or WPA3 MIX.

The cipher strength is an item for setting a key length of a key to be used in encryption. The key length can be selected from among 128 bits, 192 bits, and 256 bits. As the number of bits selected as a key length becomes larger, the security becomes higher. In a case where the key length is determined by default, this item needs not be displayed on the setting screen.

The encryption key is an item for setting a pre-shared key in a case where the WPA or the WPA2 is selected as an authentication method. In a case where the WPA3 is selected as an authentication method, the encryption key also serves as an item for setting a password in the WPA3. The user can enter an arbitrary character string or a combination of characters and numbers. In a case where the WPA or the WPA2 is set as an authentication method, the communication apparatus 103 cannot participate in a network constructed by the communication apparatus 102 if the communication apparatus 103 serving as an STA does not know a pre-shared key set in the communication apparatus 102. Similarly, also in a case where the WPA3 is set as an authentication method, the communication apparatus 103 cannot participate in a network constructed by the communication apparatus 102 if the communication apparatus 103 does not know a password in the WPA3 that is set in the communication apparatus 102. By being manually entered into the communication apparatus 103 by the user, the pre-shared key or the password in the WPA3 may be shared between the communication apparatuses 102 and 103, or may be shared by wireless communication such as NFC or Bluetooth®.

The communication apparatus 102 supports all of the authentication methods and encryption methods in the communication in the 2.4 GHz band and the 5 GHz band, and thus all combinations of encryption methods and authentication methods are displayed as options of this item as illustrated in FIG. 5. In contrast, the communication apparatus 102 supports only a part of authentication methods and encryption methods in the communication in the 6 GHz band, and thus only partial combinations of encryption methods and authentication methods are displayed as options of this item as illustrated in FIG. 6. Specifically, only options are displayed indicating combinations of the WPA3 and the Open that uses the OWE method, which are supported as authentication methods in the 6 GHz band, and the AES supported as an encryption method in the 6 GHz band.

In step S407 of FIG. 4, the communication apparatus 102 switches display from the display illustrated in FIG. 5, to the display illustrated in FIG. 6.

FIG. 6 is a diagram illustrating an example of a communication parameter setting screen to be displayed in a case where the 6 GHz band is selected as a frequency band to be used, in the first display method. In the communication in the 6 GHz band, the communication apparatus 102 supports the WPA3 as an authentication method and the Open that uses the OWE as a key sharing method, and supports the AES as an encryption method. Thus, combinations of these are displayed as options of encryption. Specifically, only OWE (AES), WPA3-SAE (AES), and WPA3-EAP (AES) are displayed. When the screen illustrated in FIG. 5 switches to the screen illustrated in FIG. 6, this item is left blank in a case where a value set as an encryption key is not to be used as a password in the WPA3 (when No is determined in step S408 of FIG. 4).

As illustrated in FIGS. 5 and 6, the user can easily recognize authentication methods usable in the selected frequency band by switching authentication methods (and encryption methods) to be displayed, in accordance with a frequency band selected by the user. It is also possible to prevent a failure in communication that is caused by the user erroneously selecting a non-usable authentication method by switching authentication methods (and encryption methods) to be displayed, in accordance with a frequency band selected by the user. The user can thereby easily select an authentication method supported in the selected frequency band.

In the first display method, an authentication method and an encryption method are collectively set in one setting item, but a display format is not limited to this. An authentication method and an encryption method may be displayed as separate setting items. In the first display method, "encryption" is used as a name of a setting item for collectively setting an authentication method and an encryption method, but the name of the setting item is not limited to this. Another name may be used, such as an authentication method, a security method, or an encryption mode.

FIGS. 7 and 8 each illustrate an example of a graphical user interface to be displayed by the communication apparatus 102 as a setting screen in the second display method. In the second display method, different setting screens are displayed for the respective frequency bands. FIG. 7 illustrates a display example of a setting screen of communication parameters in the 2.4 GHz band. FIG. 8 illustrates a display example of a setting screen of communication parameters in the 6 GHz band. The setting screens illustrated in FIGS. 7 and 8 are displayed by "advanced wireless setting (2.4 GHz)" or "advanced wireless setting (6 GHz)" being selected by the user from a left-side menu in FIGS. 7 and 8. The communication apparatus 102 determines Yes in step S402 of FIG. 4 in accordance with "advanced wireless setting (6 GHz)" being selected and the use of a wireless function being set. In step S407 of FIG. 4, the communication apparatus 102 switches the display from the setting screen illustrated in FIG. 7, to the setting screen illustrated in FIG. 8. In a case where "advanced wireless setting (5 GHz)" is selected, the communication apparatus 102 may display a setting screen illustrated in FIG. 7, similarly to the case where "advanced wireless setting (2.4 GHz)" is selected.

As illustrated in FIGS. 7 and 8, the setting screen displays, as items settable as communication parameters, whether to use a wireless function of the communication apparatus 102, a network name of a network to be constructed, and whether to use automatic channel selection. Furthermore, in addition to these items, an encryption mode, cipher strength, and an encryption key are displayed as items settable as communication parameters.

Whether to use a wireless function is an item for setting whether to use a wireless function in a selected frequency band. For example, in a case where the use of a wireless function is set on the setting screen displayed by the 2.4 GHz band being selected in the left-side menu, the 2.4 GHz band is selected as a frequency band to be used by the communication apparatus 102. The communication apparatus 102 determines Yes in step S402 in accordance with the use of a wireless function being set on the setting screen displayed by the 6 GHz band being selected in the left-side menu. The communication apparatus 102 may automatically set nonuse of a wireless function in other frequency bands in accordance with the use of a wireless function in a certain frequency band being set by the user.

The network name and whether to use automatic channel selection are similar to those illustrated in FIGS. 5 and 6.

The encryption mode is a setting item for enabling an authentication method and an encryption method to be collectively set, and is similar to the setting item of "encryption" illustrated in FIG. 5. As illustrated in FIG. 7, the communication apparatus 102 displays all of the combinations of supported authentication methods and encryption methods similarly to FIG. 5, in a case where "advanced wireless setting (2.4 GHz)" is selected. In contrast, as illustrated in FIG. 8, the communication apparatus 102 displays only combinations of authentication methods and encryption methods that are supported in the communication in the 6 GHz band similarly to FIG. 6, in a case where "advanced wireless setting (6 GHz)" is selected.

The cipher strength and the encryption key are similar to those illustrated in FIGS. 5 and 6.

In the second display method, content in corresponding setting items on the setting screen illustrated in FIG. 8 may be determined in accordance with the content set in setting items on the setting screen illustrated in FIG. 7, in a case where the setting screen illustrated in FIG. 8 is displayed. For example, in a case where WPA2-PSK is selected as an encryption mode in FIG. 7, the communication apparatus 102 may display WPA3-SAE as a default value of the encryption mode when the setting screen switches to the setting screen illustrated in FIG. 8. Alternatively, in a case where WPA2-EAP is selected as an encryption mode in FIG. 7, the communication apparatus 102 may display WPA3-EAP as a default value of the encryption mode when the setting screen switches to the setting screen illustrated in FIG. 8.

Alternatively, the communication apparatus 102 may display WPA3-EAP as a default value of the encryption mode irrespective of content set in the encryption mode in FIG. 7 when the communication apparatus 102 displays the setting screen illustrated in FIG. 8.

As illustrated in FIGS. 7 and 8, the communication apparatus 102 switches options of settable authentication methods and encryption methods in accordance with a frequency band for which the user sets communication parameters. The user can thereby easily select an authentication method and an encryption method that are supported in a frequency band for which a setting is made.

In the second display method, a setting screen to be displayed is switched between the setting screen illustrated in FIG. 7 and the setting screen illustrated in FIG. 8, in accordance with a frequency band selected by the user as a frequency band for which communication parameters are set, but a display format is not limited to this. The communication apparatus 102 may prepare setting screens corresponding to the respective frequency bands, as tabs, or prepare other screens to be displayed by the selection of links corresponding to the respective frequency bands. Alternatively, a free entry field into which the user can freely enter values may be provided on the setting screen, and the setting screen illustrated in FIG. 8 may be displayed in accordance with the user entering "6 GHz" into the free entry field.

Figure 9:
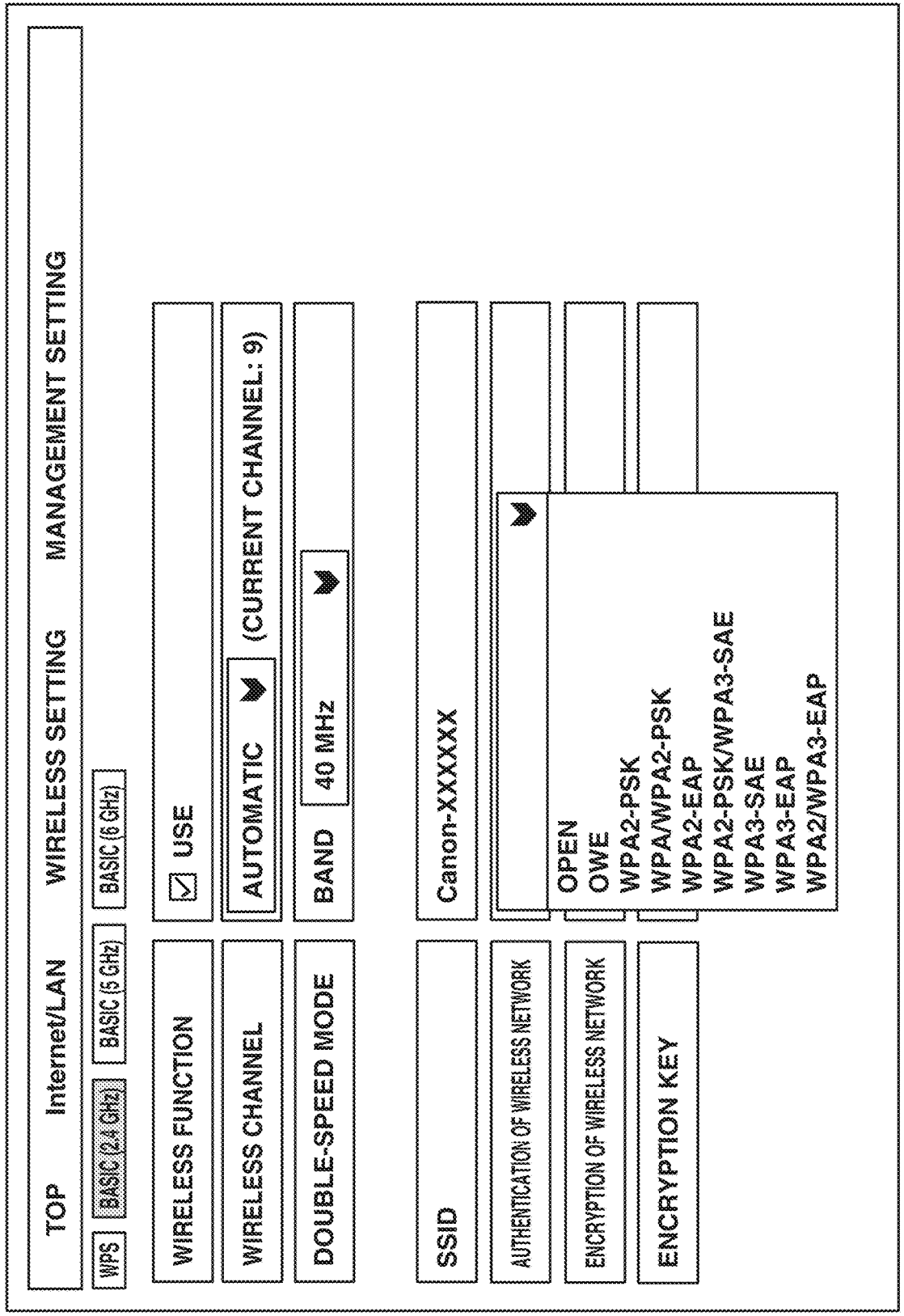
FIG. 9 is a diagram illustrating an example of a graphical user interface to be displayed by the communication apparatus 102 using a third display method.
Figure 10:
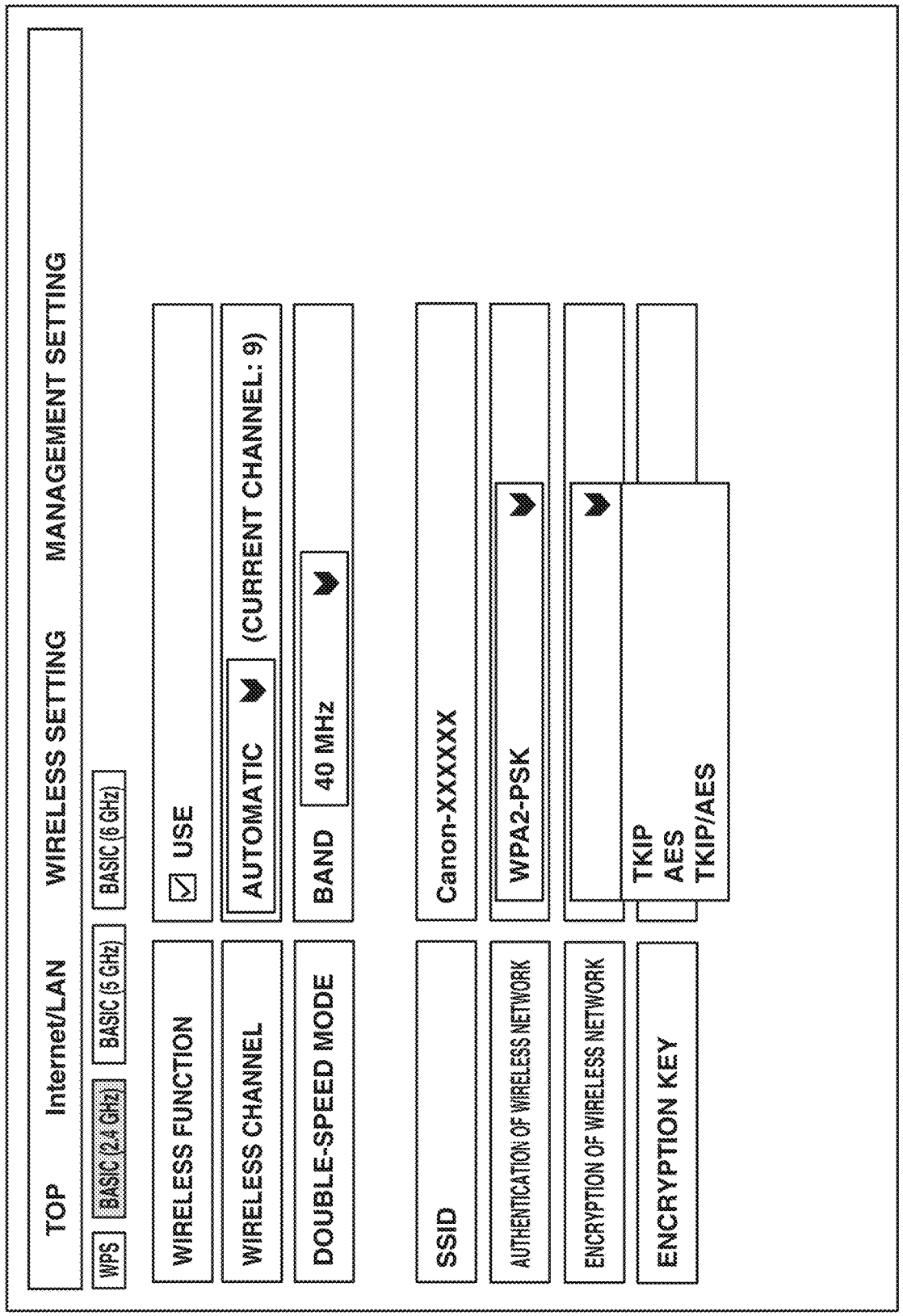
FIG. 10 is a diagram illustrating another example of a graphical user interface to be displayed by the communication apparatus 102 using the third display method.
Figure 11:
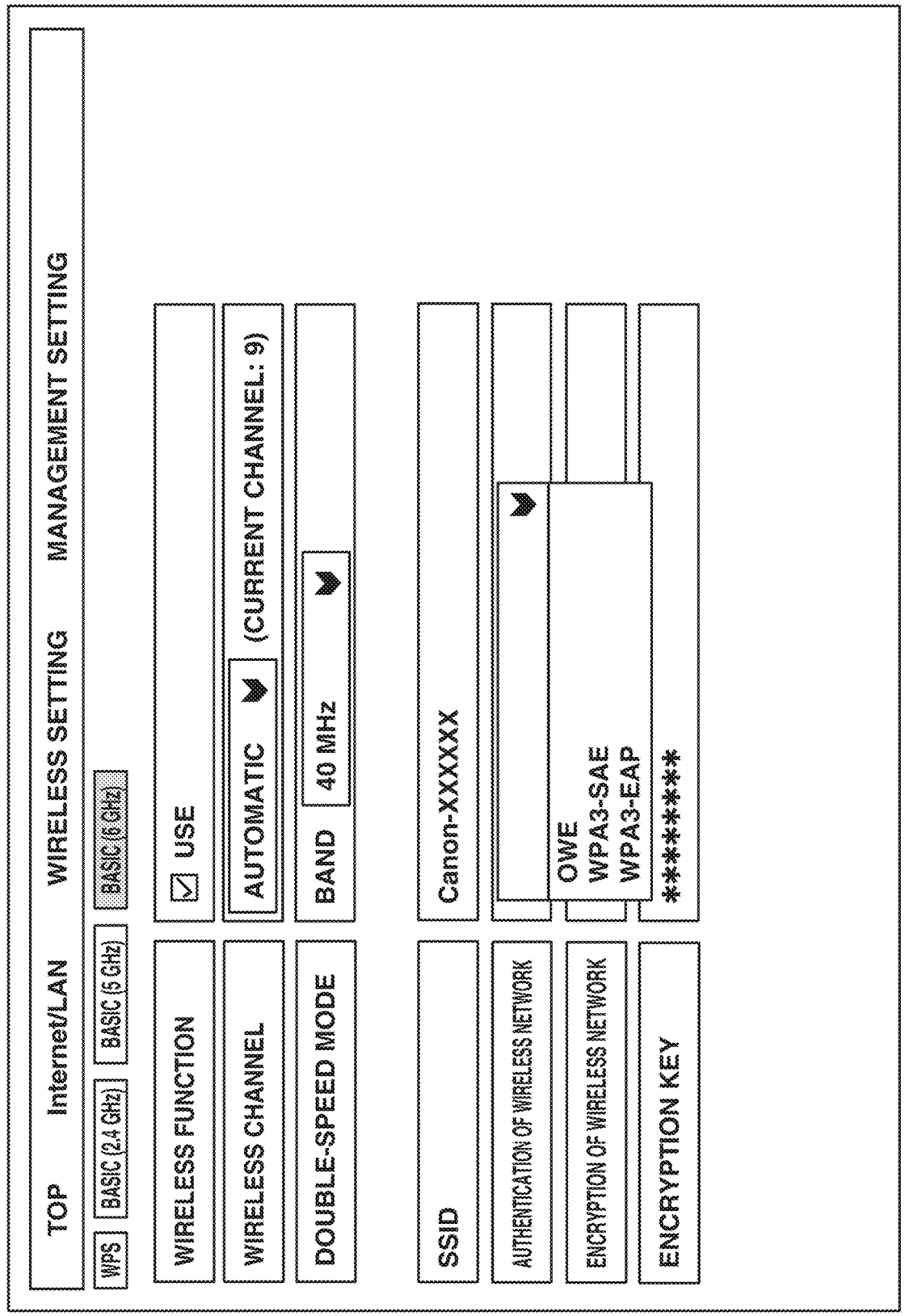
FIG. 11 is a diagram illustrating another example of a graphical user interface to be displayed by the communication apparatus 102 using the third display method.
Figure 12:
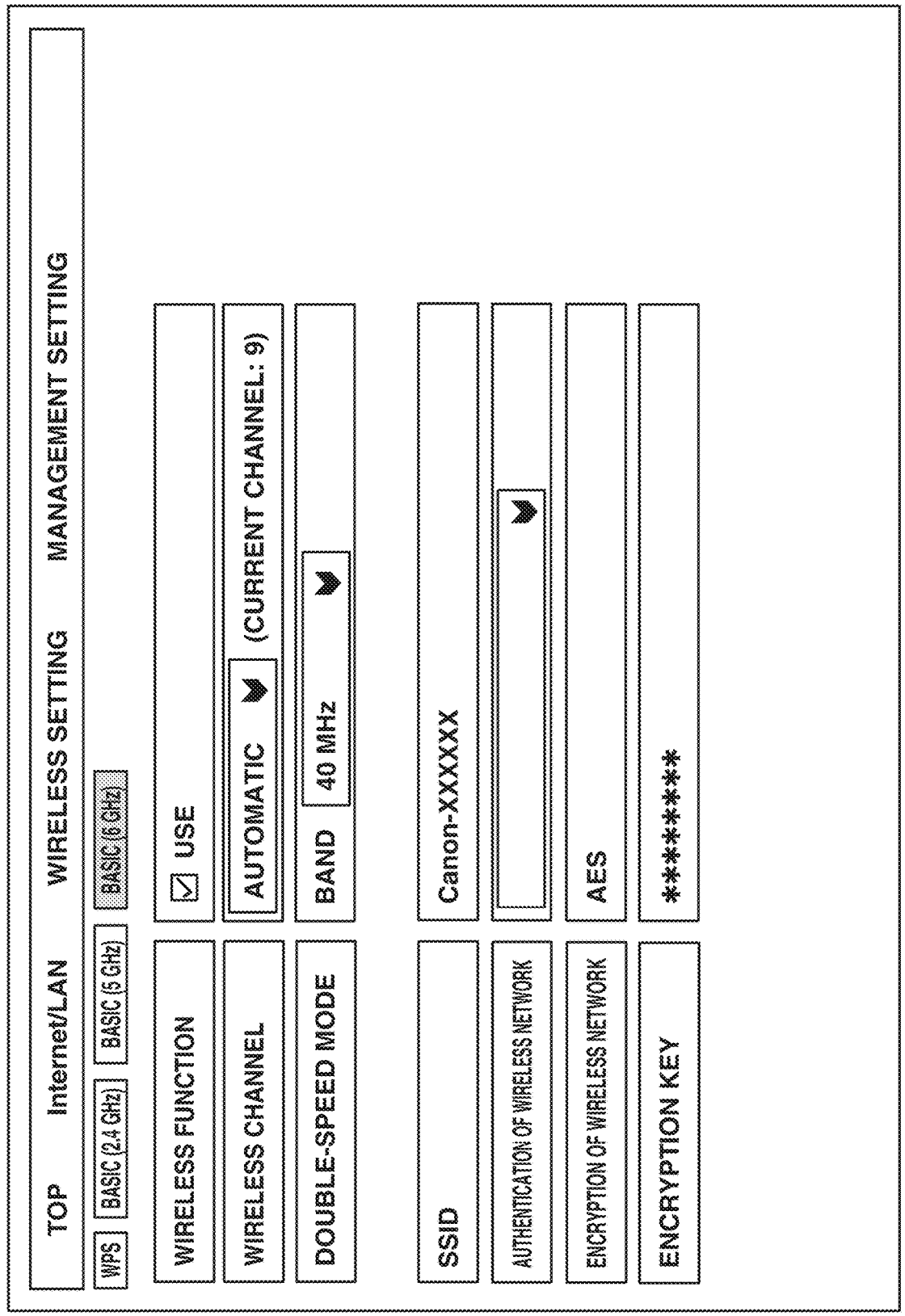
FIG. 12 is a diagram illustrating another example of a graphical user interface to be displayed by the communication apparatus 102 using the third display method.

FIGS. 9 to 12 each illustrate an example of a graphical user interface to be displayed by the communication apparatus 102 as a setting screen in the third display method. In the third display method, different setting screens are displayed for the respective frequency bands, and an authentication method and an encryption method are displayed as other setting items. FIGS. 9 and 10 each illustrate a display example of a setting screen of communication parameters in the 2.4 GHz band. FIG. 9 illustrates a display example of options of authentication methods, and FIG. 10 illustrates a display example of options of encryption methods. FIGS. 11 and 12 each illustrate a display example of a setting screen of communication parameters in the 6 GHz band. FIG. 11 illustrates a display example of options of authentication methods, and FIG. 12 illustrates a display example of options of encryption methods. The setting screens illustrated in FIGS. 9 and 10 are displayed in a case where "basic (2.4 GHz)" is selected by the user from a tab menu in FIGS. 9 and 10. The setting screens illustrated in FIGS. 11 and 12 are displayed in a case where "basic (6 GHz)" is selected by the user from a tab menu illustrated in FIGS. 11 and 12. The communication apparatus 102 determines Yes in step S402 of FIG. 4 in accordance with "basic (6 GHz)" being selected and the use of a wireless function being set. In step S407 of FIG. 4, the communication apparatus 102 switches the display from the setting screens illustrated in FIGS. 9 and 10, to the setting screens illustrated in FIGS. 11 and 12. In a case where "basic (5 GHz)" is selected, the communication apparatus 102 may display setting screens illustrated in FIGS. 9 and 10, similarly to the case where "basic (2.4 GHz)" is selected.

As illustrated in FIGS. 9 to 12, the setting screen displays, as items settable as communication parameters, whether to use a wireless function of the communication apparatus 102, a wireless channel, a band in a double-speed mode, an SSID, authentication of a wireless network, encryption of a wireless network, and an encryption key.

Whether to use a wireless function is similar to that illustrated in FIGS. 7 and 8.

The wireless channel is a setting item for setting a frequency channel to be used in the communication in a selected frequency band. In a case where "automatic" is selected in this setting item, the communication apparatus 102 selects a relatively less-crowded frequency channel as a frequency channel to be used, based on the number of received Probe Requests. The user can also designate a specific frequency channel. This setting item is displayed as an option for enabling a frequency channel corresponding to a selected frequency band, to be selected.

The double-speed mode is an item for setting a bandwidth to be used in the communication in a selected frequency band. The user can select any of 20 MHz, 40 MHz, 80 MHz, 160 MHz, and 320 MHz as a bandwidth to be used. As an option, an option indicating that the double-speed mode is not to be used may be included in place of 20 MHz.

The SSID is a setting item similar to the network name illustrated in FIGS. 5 and 6.

The authentication of a wireless network is an item for setting an authentication method of a network to be constructed by the communication apparatus 102. The encryption of a wireless network is an item for setting an encryption method of a network to be constructed by the communication apparatus 102. In the first display method and the second display method, an authentication method and an encryption method are collectively set in one setting item. In the third display method, however, an authentication method and an encryption method are individually set in different setting items. As illustrated in FIG. 9, the communication apparatus 102 displays all of the supported authentication methods as options in a case where communication parameters in the 2.4 GHz band are to be set. Specifically, the communication apparatus 102 displays, as options of authentication methods, Open, OWE, WPA2-PSK, WPA/WPA2-PSK, WPA2-EAP, WPA2-PSK/WPA3-SAE, WPA3-SAE, WPA3-EAP, and WPA2/WPA3-EAP. Furthermore, the communication apparatus 102 displays all of the supported encryption methods as options as illustrated in FIG. 10 in a case where communication parameters in the 2.4 GHz band are to be set. Specifically, the communication apparatus 102 displays TKIP, AES, and TKIP/AES, as options of encryption methods. TKIP/AES may also be expressed as MIX.

In contrast, the communication apparatus 102 displays only authentication methods supported in the communication in the 6 GHz band in a case where communication parameters in the 6 GHz band are to be set, as illustrated in FIG. 11. Specifically, the communication apparatus 102 displays OWE, WPA3-SAE, and WPA3-EAP, as options of authentication methods. Similarly, the communication apparatus 102 displays only an encryption method supported in the communication in the 6 GHz band in a case where communication parameters in the 6 GHz band are to be set, as illustrated in FIG. 12. Specifically, the communication apparatus 102 displays AES as an option of an encryption method. In the present exemplary embodiment, the communication apparatus 102 only supports the AES as an encryption method in the 6 GHz band, the AES may therefore be fixedly set in a setting item of an encryption method in the 6 GHz band.

The encryption key is similar to that illustrated in FIGS. 5 and 6.

As illustrated in FIGS. 9 to 12, the user can easily select appropriate authentication method and encryption method by the communication apparatus 102 switching the display in accordance with a selected frequency band, even in a case where an authentication method and an encryption method are individually set.

Figure 13:
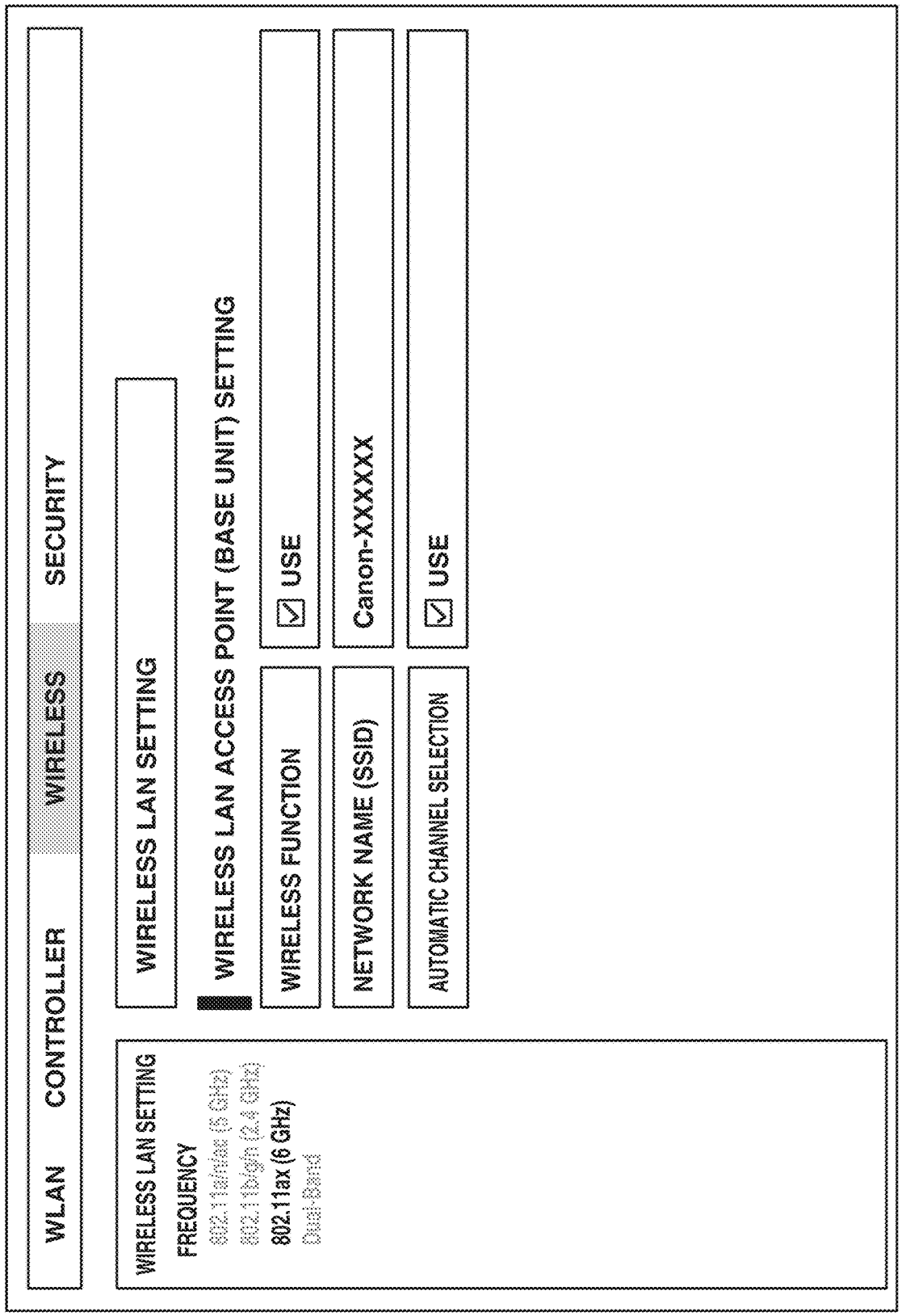
FIG. 13 is a diagram illustrating an example of a graphical user interface to be displayed by the communication apparatus 102 using a fourth display method.
Figure 14:
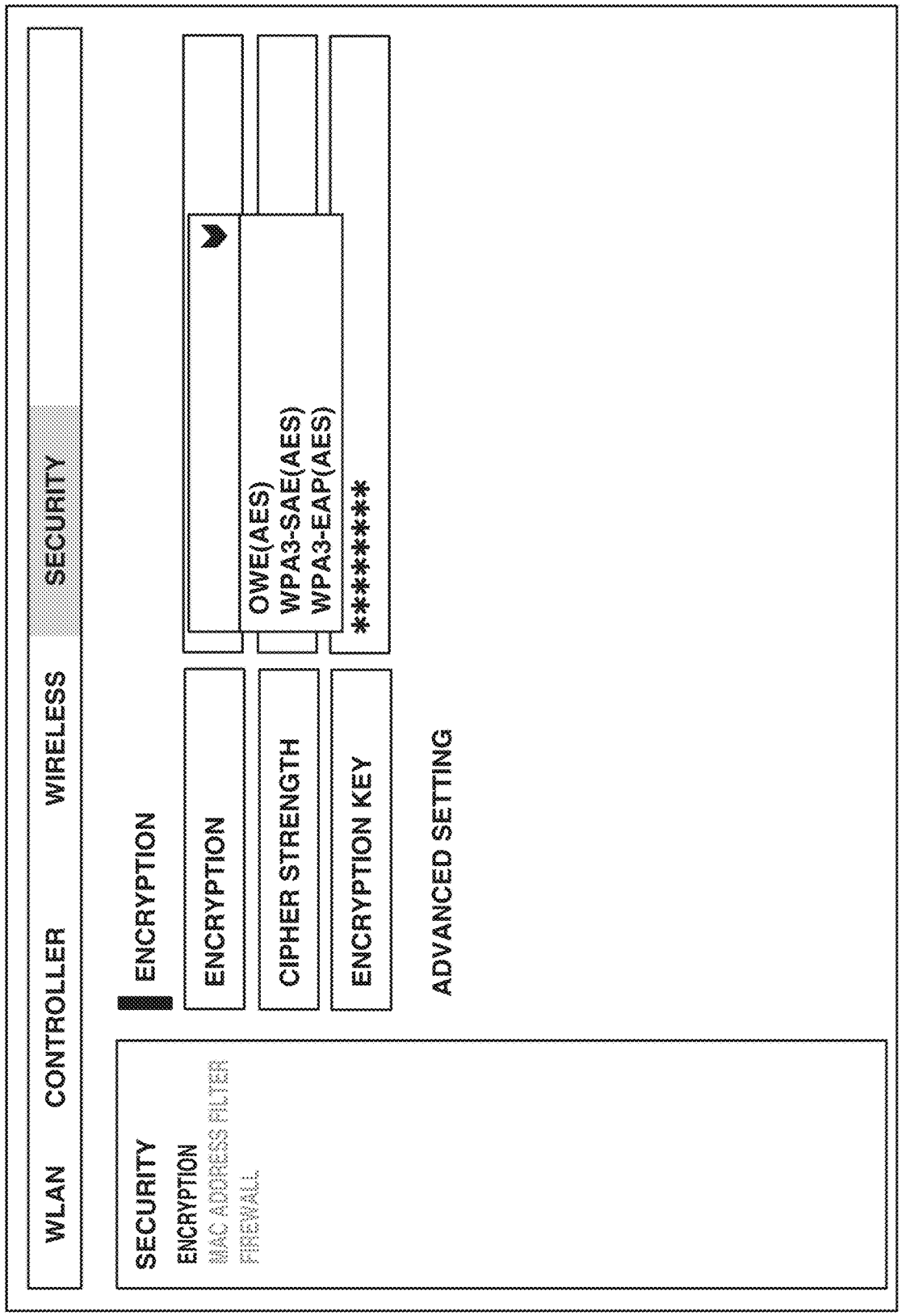
FIG. 14 is a diagram illustrating another example of a graphical user interface to be displayed by the communication apparatus 102 using the fourth display method.

FIGS. 13 and 14 each illustrate an example of a graphical user interface to be displayed by the communication apparatus 102 as a setting screen in the fourth display method. In the fourth display method, a setting of a frequency band to be used, and an authentication method and an encryption method that are to be used are set on different setting screens. FIG. 13 illustrates a display example of a setting screen for setting a frequency band to be used. FIG. 14 illustrates a display example of a setting screen for setting an authentication method and an encryption method that are to be used. The setting screen illustrated in FIG. 13 is displayed by "WIRELESS" being selected by the user from an upper menu illustrated in FIG. 13. The setting screen illustrated in FIG. 14 is displayed by "SECURITY" being selected by the user from the upper menu in FIG. 14. The communication apparatus 102 determines Yes in step S402 of FIG. 4 in accordance with "802.11ax (6 GHz)" being further selected in the left-side menu in FIG. 13, and the "use" of the wireless function being selected on the display screen on which "WIRELESS" is selected. In step S407 of FIG. 4, the communication apparatus 102 switches a setting screen to be displayed in a case where "SECURITY" is selected by the user, to the setting screen illustrated in FIG. 14.

FIG. 13 illustrates an example of a setting screen to be displayed in a case where "WIRELESS" is selected from the upper menu. On the left side of the setting screen, menus for transitioning to setting screens corresponding to the respective frequency bands are displayed. The frequency bands are displayed as "802.11a/n/ac (5 GHz)", "802.11b/g/n (2.4 GHz)", and "802.11ax (6 GHz)". The frequency bands may be simply displayed as 5 GHz, 2.4 GHz, and 6 GHz. If any of these menus is selected, a setting screen for setting whether to use a wireless function, a network name, and whether to use automatic channel selection, as communication parameters is displayed as illustrated in FIG. 13. In this case, whether to use a wireless function in the 2.4 GHz band, and the like can be set in the case of, for example, a setting screen displayed by the 2.4 GHz band being selected in the left-side menu.

Whether to use a wireless function is an item for setting whether to use a wireless function in a selected frequency band. For example, in a case where the use of a wireless function is set on the setting screen displayed by the 2.4 GHz band being selected in the left-side menu, the 2.4 GHz band is selected as a frequency band to be used by the communication apparatus 102. The communication apparatus 102 determines Yes in step S402 in accordance with the use of a wireless function being set on the setting screen displayed by the 6 GHz band being selected in the left-side menu. In accordance with the use of a wireless function in a certain frequency band being set by the user, the communication apparatus 102 may automatically set nonuse of a wireless function in other frequency bands.

The network name and whether to use automatic channel selection are similar to those illustrated in FIGS. 5 and 6.

FIG. 14 illustrates an example of a setting screen to be displayed in a case where "SECURITY" is selected in the upper menu. As illustrated in FIG. 14, encryption of the communication apparatus 102, cipher strength, and an encryption key are displayed on the setting screen as items settable as communication parameters.

The encryption is an item for collectively setting an authentication method and an encryption method that are to be used by the communication apparatus 102 in communication similarly to that illustrated in FIGS. 5 and 6. In the present exemplary embodiment, the 6 GHz band is set as a frequency band to be used, on the setting screen illustrated in FIG. 13, and thus only combinations of authentication methods and encryption methods that are supported in the 6 GHz band are displayed on the setting screen illustrated in FIG. 14. In a case where the 2.4 GHz band or the 5 GHz band is set as a frequency band to be used, all of the combinations of supported authentication methods and encryption methods are displayed as options in the setting item of the encryption, similarly to FIG. 5. In step S407 of FIG. 4, the setting screen illustrated in FIG. 14 is displayed.

As illustrated in FIGS. 13 and 14, the user can easily set an appropriate authentication method by switching the display of a setting screen for setting an authentication method in accordance with a set frequency band, even in a case where a frequency band and an authentication method are set on different setting screens. Similarly, the user can easily set an appropriate encryption method by switching the display of an encryption method in accordance with a set frequency band.

In the fourth display method, a combination of an authentication method and an encryption method is set using a common setting screen shared among all of the frequency bands, but the setting screen is not limited to this. The communication apparatus 102 may be capable of setting authentication methods and encryption methods using setting screens different for the respective frequency bands. Specifically, the communication apparatus 102 may individually display a setting screen of an authentication method and an encryption method for the 2.4 GHz band, a setting screen of an authentication method and an encryption method for the 5 GHz band, and a setting screen of an authentication method and an encryption method for the 6 GHz band.

In the fourth display method, a frequency band and an authentication method are individually set on other setting screens, but a display format is not limited to this. Setting items for setting an authentication method and an encryption method may be displayed on the setting screen following items displayed on a setting screen of a frequency band. In this case, the items illustrated in FIG. 14 may be displayed in an accordion menu format in which the items are displayed in an expanded state by a link being selected. For example, a link labelled with "advanced setting" may be displayed following the setting items illustrated in FIG. 13. In accordance with the link of "advanced setting" being selected by the user, the items illustrated in FIG. 14 are displayed in an expanded state.

Alternatively, a link to the setting screen illustrated in FIG. 14 may be added to a position below the setting items illustrated in FIG. 13. By describing a link to a setting screen of an authentication method and an encryption method, on a setting screen of a frequency band, the user can easily transition to a setting screen of an authentication method and an encryption method after setting a frequency band.

Figure 15:
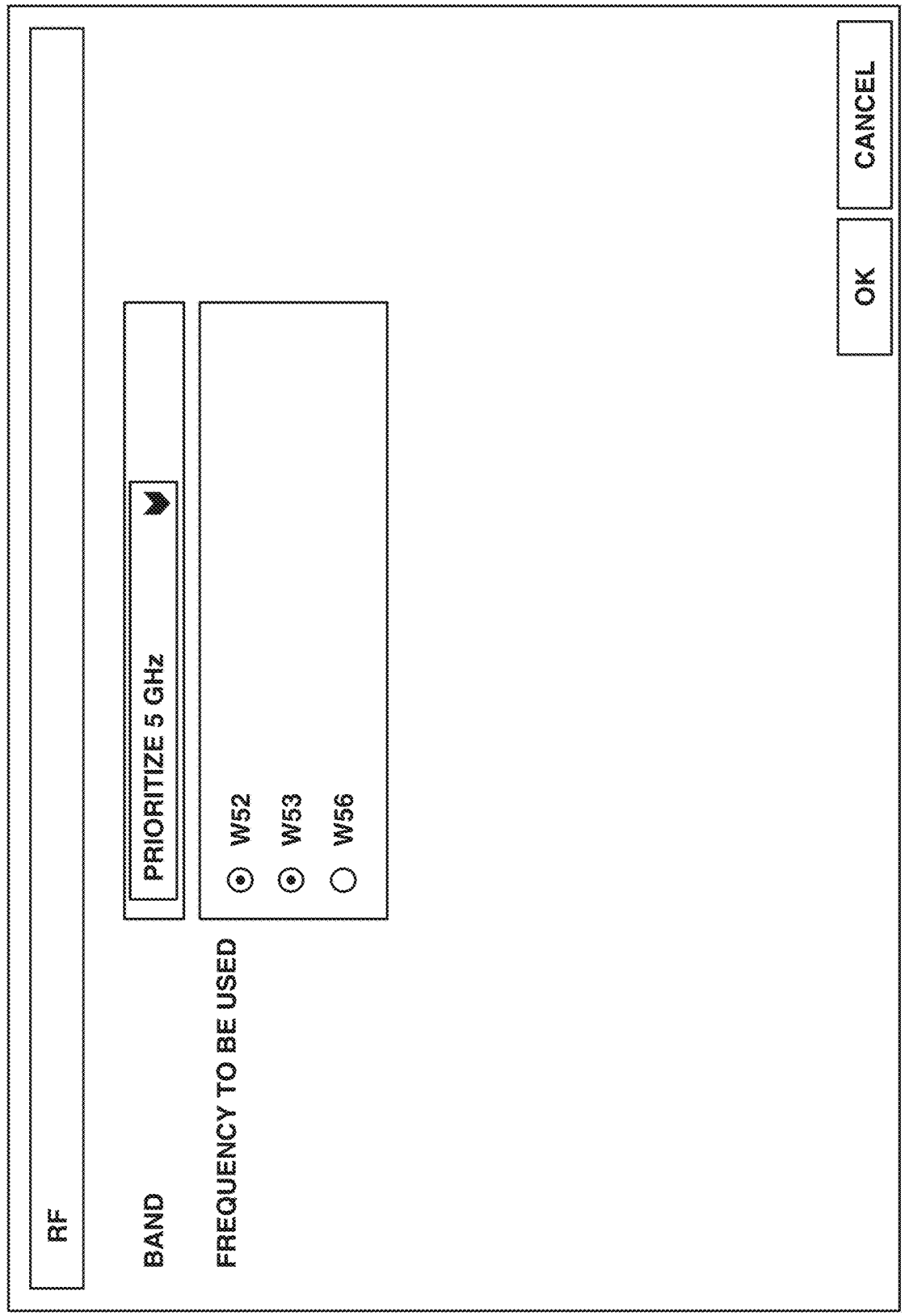
FIG. 15 is a diagram illustrating an example of a graphical user interface to be displayed by the communication apparatus 102 using a fifth display method.
Figure 16:
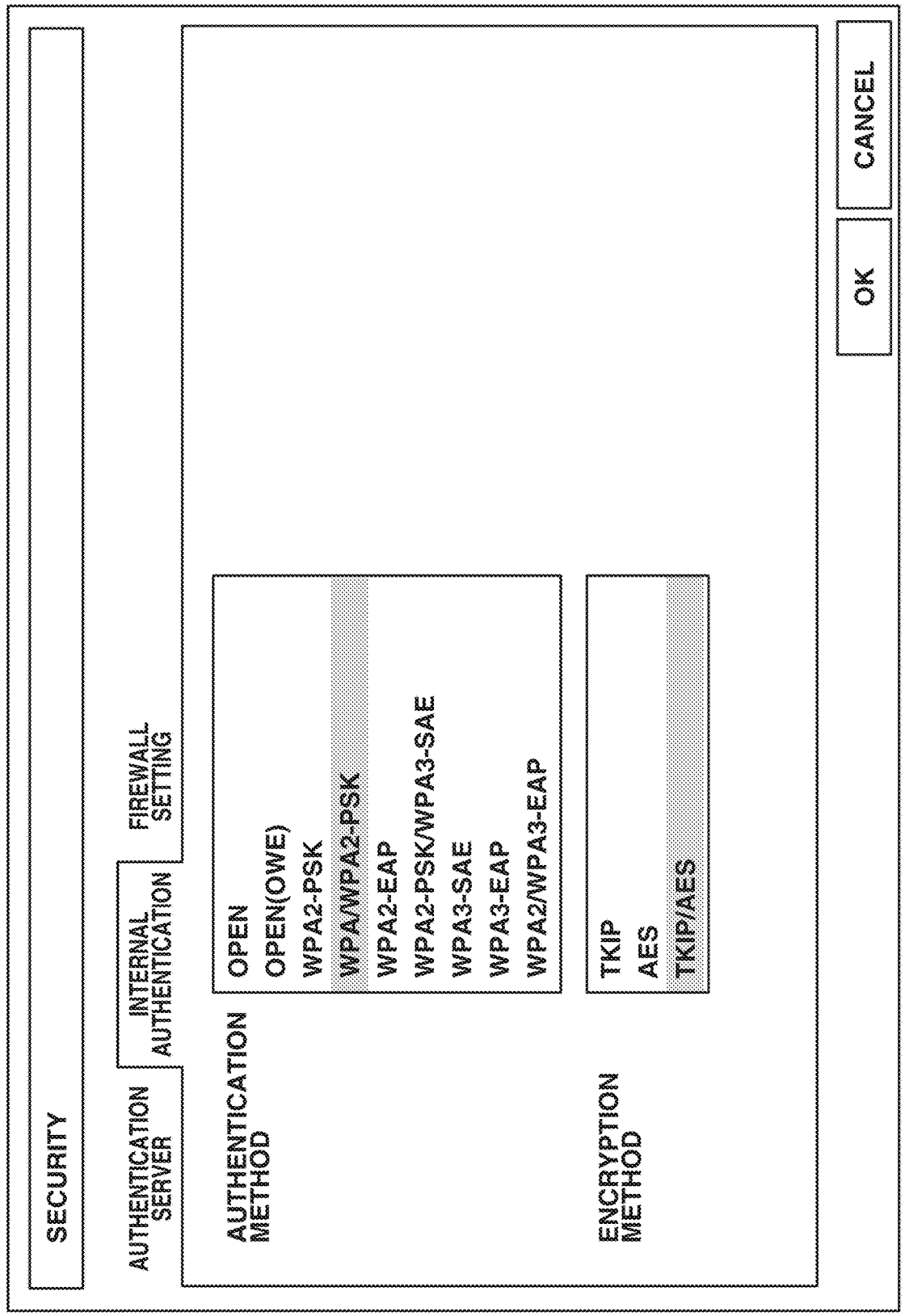
FIG. 16 is a diagram illustrating another example of a graphical user interface to be displayed by the communication apparatus 102 using the fifth display method.
Figure 17:
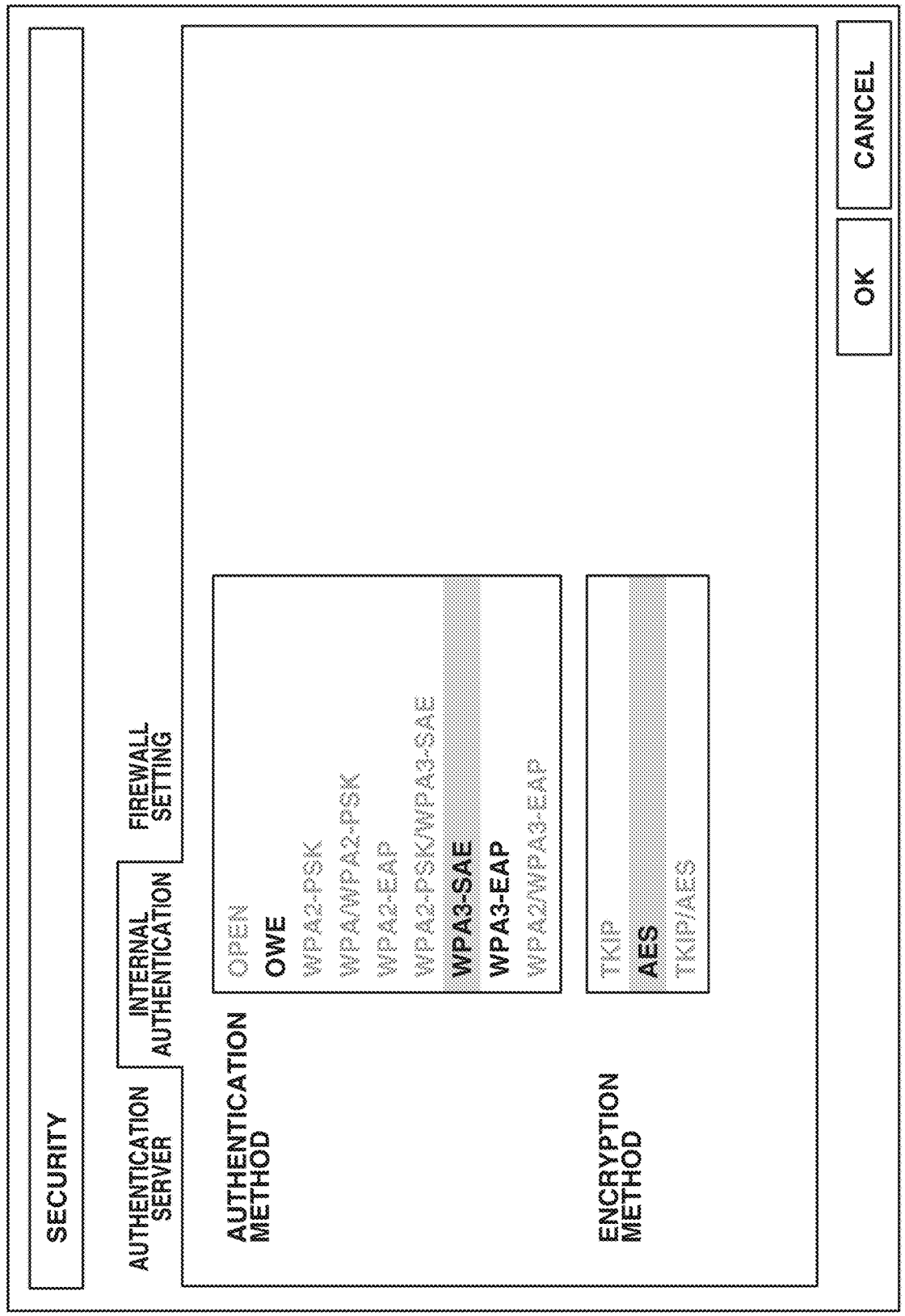
FIG. 17 is a diagram illustrating another example of a graphical user interface to be displayed by the communication apparatus 102 using the fifth display method.

FIGS. 15 and 16 each illustrate an example of a graphical user interface to be displayed by the communication apparatus 102 as a setting screen in the fifth display method. In the fifth display method, an authentication method and an encryption method are set on a setting screen different from a setting screen of a frequency band. An authentication method and an encryption method are set by different setting items. FIG. 15 illustrates a display example of a setting screen for setting a frequency band to be used. FIG. 16 illustrates a display example of a setting screen for setting an authentication method and an encryption method in a case where the 2.4 GHz band or the 5 GHz band is selected as a frequency band to be used. FIG. 17 illustrates a display example of a setting screen for setting an authentication method and an encryption method in a case where the 6 GHz band is selected as a frequency band to be used. If the user issues an instruction to display a setting screen for setting a frequency band or a frequency channel, the communication apparatus 102 displays the setting screen illustrated in FIG. 15. If the user issues an instruction to display a setting screen for setting at least one of an authentication method or an encryption method, the communication apparatus 102 displays the setting screen illustrated in FIG. 16 or 17. In a case where the 2.4 GHz band or the 5 GHz band is set as a frequency band to be used, the communication apparatus 102 displays the setting screen illustrated in FIG. 16. In a case where the 6 GHz band is set as a frequency band to be used, the communication apparatus 102 displays the setting screen illustrated in FIG. 17. The communication apparatus 102 determines Yes in step S402 of FIG. 4 in accordance with the 6 GHz band being selected as a frequency band to be used, on the setting screen illustrated in FIG. 15. In step S407 of FIG. 4, the communication apparatus 102 switches a setting screen of a authentication method and an encryption method from the setting screen illustrated in FIG. 16, to the setting screen displayed in FIG. 17.

FIG. 15 illustrates an example of a setting screen to be displayed in a case where the user issues an instruction to display a setting screen for setting a frequency band or a frequency channel. As illustrated in FIG. 15, a band to be used by the communication apparatus 102 and a frequency are displayed on the setting screen as items settable as communication parameters.

The band is a setting item for setting a frequency band to be used by the communication apparatus 102. Specifically, options of this setting item to be displayed include "only the 2.4 GHz band", "only the 5 GHz band", "only the 6 GHz band", "prioritize the 2.4 GHz band", "prioritize the 5 GHz band", and "prioritize the 6 GHz band". In addition to these, options of this setting item to be displayed include Dual-band (the 2.4 GHz band, the 5 GHz band), Dual-band (the 5 GHz band, the 6 GHz band), and Dual-band (the 2.4 GHz band, the 6 GHz band). Furthermore, Triple-band (the 2.4 GHz band, the 5 GHz band, the 6 GHz band) is displayed as an option. In addition to these, "prioritize the 2.4 GHz band (excluding the 5 GHz band)", "prioritize the 2.4 GHz band (excluding the 6 GHz band)", "prioritize the 5 GHz band (excluding the 2.4 GHz band)", and "prioritize the 5 GHz band (excluding the 6 GHz band)" are also displayed as options. In addition to these, "prioritize the 6 GHz band (excluding the 2.4 GHz band)" and "prioritize the 6 GHz band (excluding the 5 GHz band)" are displayed as options.

The options of "only the 2.4 GHz band", "only the 5 GHz band", and "only the 6 GHz band" are options indicating the use of only the respective designated frequency bands. In a case where any of these options is selected, other frequency bands are not used. The options of "prioritize the 2.4 GHz band", "prioritize the 5 GHz band", and "prioritize the 6 GHz band" are options indicating that the respective designated frequency bands are to be preferentially used, but other frequency bands can be used in a case where the designated frequency bands are unsuitable due to reasons such as congestion. In cases where "prioritize the 2.4 GHz band" and "prioritize the 5 GHz band" are selected, and in a case where set authentication method and encryption method are unsupported in the communication in the 6 GHz band, the 6 GHz band is not used. Alternatively, in cases where "prioritize the 2.4 GHz band" and "prioritize the 5 GHz band" are selected, the communication apparatus 102 may display only authentication methods and encryption methods that are supported in the 6 GHz band, as options of authentication methods and encryption methods. In this case, even in cases where "prioritize the 2.4 GHz band" and "prioritize the 5 GHz band" are selected, the communication apparatus 102 may use the 6 GHz band. The Dual-band and the Triple-band are options indicating that networks can be established in the respective designated frequency bands and concurrently maintained. For example, in a case where Dual-band (the 2.4 GHz band, the 5 GHz band) is selected, the communication apparatus 102 respectively establishes networks in both frequency bands of the 2.4 GHz band and the 5 GHz band. In this case, the communication apparatus 102 simultaneously maintains two networks with different frequency bands. In a case where Triple-band is selected, the communication apparatus 102 simultaneously maintains three networks with different frequency bands. The option for prioritizing a specific frequency band and excluding a different frequency band, such as "prioritize the 2.4 GHz band (excluding the 5 GHz band)", is an option indicating that a specific frequency is to be preferentially used, and a frequency band designated to be excluded is not used. In this case, the communication apparatus 102 does not use a frequency band designated to be excluded, irrespective of set authentication method and encryption method.

In this item, the communication apparatus 102 determines Yes in step S402 of FIG. 4, in a case where an option including the 6 GHz band as a frequency band to be used is designated. In a case where Dual-band including the 6 GHz band is selected in this item, the communication apparatus 102 may skip the processing in steps S404 to S406, because the communication apparatus 102 can maintain communication in at least one of the 2.4 GHz band and the 5 GHz band concurrently with the communication in the 6 GHz band. Also in a case where Triple-band is selected in this item, the communication apparatus 102 may similarly skip the processing in steps S404 to S406.

The frequency to be used is a setting item for setting a frequency channel or a type to be used in a designated frequency band. The type is a collective term of a plurality of frequency channels. In the 5 GHz band, the type can be selected from among three types including W52 (ch 36 to ch 48), W53 (ch 52 to ch 62), and W56 (ch 100 to ch 140). In this setting item, the user can select one or more frequency channels or types. In the selection of a frequency band to be used, a frequency channel or a type to be used can be designated for each of the frequency bands in a case where the selection is made in such a manner that a plurality of frequency bands can be used.

If the user issues an instruction to complete the setting by pressing an OK button on the setting screen illustrated in FIG. 15, a frequency band and a frequency channel that are to be used by the communication apparatus 102 in communication are set.

Next, a setting screen will be described with reference to FIGS. 16 and 17, the setting screen being to be displayed in a case where the user issues an instruction to display a setting screen for setting at least one of an authentication method or an encryption method.

In a case where an option not including the 6 GHz band is selected as a frequency band to be used in the setting screen illustrated in FIG. 15, the setting screen illustrated in FIG. 16 is displayed as a setting screen for selecting at least one of an authentication method or an encryption method. On the setting screen illustrated in FIG. 16, setting items for setting an authentication method and an encryption method are separately displayed. In the case of FIG. 16, the communication apparatus 102 displays all of the authentication methods supported by the communication apparatus 102, in a selectable state as options of authentication methods. Specifically, the communication apparatus 102 displays options similar to those illustrated in FIG. 9. The communication apparatus 102 also displays all of the encryption methods supported by the communication apparatus 102, in a selectable state as options of encryption methods. Specifically, the communication apparatus 102 displays options similar to those illustrated in FIG. 10.

In contrast, in a case where an option including the 6 GHz band is selected as a frequency band to be used in the setting screen illustrated in FIG. 15, the setting screen illustrated in FIG. 17 is displayed as a setting screen for selecting at least one of an authentication method or an encryption method. On the setting screen illustrated in FIG. 17, setting items for setting an authentication method and an encryption method are separately displayed. In the case of FIG. 17, the communication apparatus 102 displays authentication methods supported by the communication apparatus 102 in the communication in the 6 GHz band, in a selectable state as options of authentication methods. Specifically, the communication apparatus 102 displays options similar to those illustrated in FIG. 11, in a selectable state, and displays other options in an unselectable state by graying out these options. The communication apparatus 102 displays an encryption method supported by the communication apparatus 102 in the communication in the 6 GHz band, in a selectable state as an option of an encryption method. Specifically, the communication apparatus 102 displays an option similar to that illustrated in FIG. 10, in a selectable state, and displays other options in an unselectable state by graying out these options. In the setting screen illustrated in FIG. 17, the communication apparatus 102 may display only selectable options by hiding unselectable options.

As illustrated in FIGS. 15 to 17, the user can easily select appropriate authentication method and encryption method by switching authentication methods and encryption methods to be displayed in a selectable state, in accordance with whether an option selected as a frequency band to be used includes the 6 GHz band.

Figure 18:
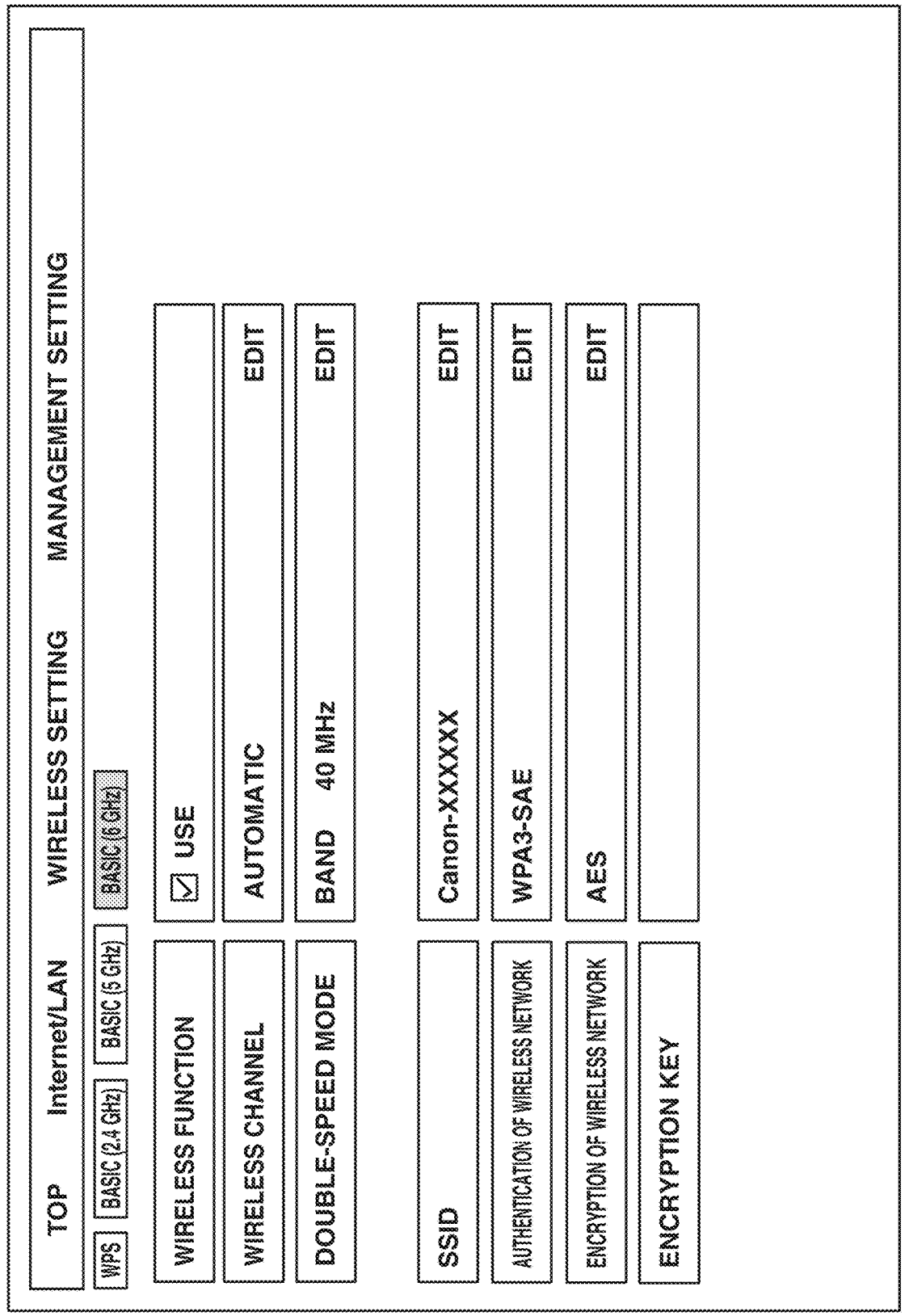
FIG. 18 is a diagram illustrating an example of a graphical user interface to be displayed by the communication apparatus 102 using a sixth display method.
Figure 19:
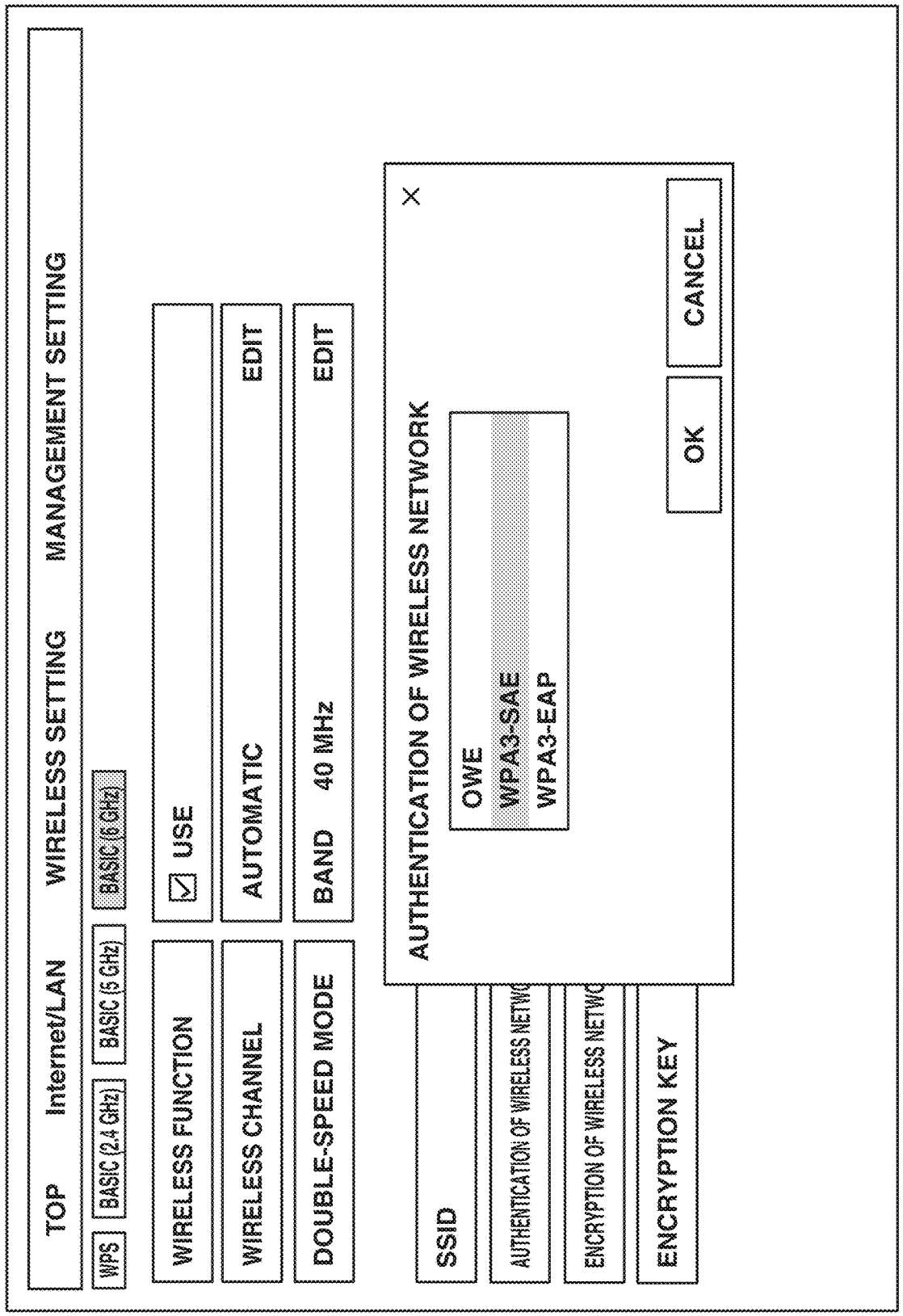
FIG. 19 is a diagram illustrating another example of a graphical user interface to be displayed by the communication apparatus 102 using the sixth display method.

FIGS. 18 and 19 each illustrate an example of a graphical user interface to be displayed by the communication apparatus 102 as a setting screen in the sixth display method. In the sixth display method, the display of an authentication method and an encryption method is switched in accordance with a frequency band selected to be used. In the sixth display method, communication parameters can be set for each frequency band. FIG. 18 illustrates a display example of a setting screen for setting communication parameters for the communication in the 6 GHz band that is to be displayed in a case where "basic (6 GHz)" is selected from an upper tab menu.

FIG. 19 illustrates a display example of a pop-up menu to be displayed when an authentication method is set in the setting screen illustrated FIG. 18. The communication apparatus 102 determines Yes in step S402 of FIG. 4 in accordance with "basic (6 GHz)" being selected from the upper tab menu and the use of a wireless function being set.

FIG. 18 illustrates a display example of a setting screen for setting communication parameters for the communication in the 6 GHz band. As illustrated in FIG. 18, whether to use a wireless function of the communication apparatus 102, a wireless channel, a band in a double-speed mode, an SSID, authentication of a wireless network, encryption of a wireless network, and an encryption key are displayed on the setting screen as items settable as communication parameters.

For each setting item, a link labelled with "edit" is prepared. If the link is selected by the user, a corresponding item becomes editable. Specifically, entry into the corresponding item becomes executable or an option of the corresponding item is displayed. In the present exemplary embodiment, an entry field or an option is displayed as a pop-up menu, but a display format is not limited to this. A value may be directly entered into each item displayed on the setting screen illustrated in FIG. 18, or a pull-down menu may be displayed. Instead of the link, each item may become editable upon receiving voice input for issuing an edit instruction of the corresponding item, from the user.

Whether to use a wireless function is similar to that illustrated in FIGS. 7 and 8.

The wireless channel and the double-speed mode are similar to those illustrated in FIGS. 9 to 12.

The SSID is similar to the network name illustrated in FIGS. 5 and 6.

The authentication of a wireless network is a setting item for setting an authentication method to be used by the communication apparatus 102. In a case where the 6 GHz band is selected as a frequency band to be used, authentication methods supported by the communication apparatus 102 in the communication in the 6 GHz band are displayed as options, as illustrated in FIG. 19. Specifically, options similar to those illustrated in FIG. 11 are displayed. In a case where the 2.4 GHz band or the 5 GHz band is selected as a frequency band to be used, all of the authentication methods supported by the communication apparatus 102 are displayed as options. Specifically, options similar to those illustrated in FIG. 9 are displayed.

The encryption of a wireless network is a setting item for selecting an encryption method to be used by the communication apparatus 102. In a case where the 6 GHz band is selected as a frequency band to be used, an encryption method supported by the communication apparatus 102 in the communication in the 6 GHz band is displayed as an option. Specifically, an option similar to that illustrated in FIG. 12 is displayed. In the present exemplary embodiment, in this case, the AES may be set as a fixed value in this item, because an encryption method supported by the communication apparatus 102 in the communication in the 6 GHz band is only AES. In contrast, in a case where the 2.4 GHz band or the 5 GHz band is selected as a frequency band to be used, all of the encryption methods supported by the communication apparatus 102 are displayed as options. Specifically, options similar to those illustrated in FIG. 10 are displayed.

The encryption key is similar to that illustrated in FIGS. 5 and 6.

In step S407 of FIG. 4, the communication apparatus 102 switches options in a pop-up menu to be displayed when the user issues an edit instruction of an authentication method and an encryption method, to options illustrated in FIG. 19, for example. The user can thereby select appropriate authentication method and encryption method in accordance with a frequency band to be used.

As described above in the first to sixth display methods, options to be displayed or to be displayed in a selectable state as authentication methods are switched in accordance with a frequency band to be used, and the user can thereby easily set an appropriate authentication method. In addition to or instead of this, options to be displayed or to be displayed in a selectable state as encryption methods are switched in accordance with a frequency band to be used, and the user can thereby easily set an appropriate encryption method.

On the setting screens described as the first to sixth display methods, an item for setting another communication parameter may be added onto a setting screen. Alternatively, some of the setting items may not be displayed. Furthermore, at least one setting item included in a setting screen in any display method of the first to sixth display methods may be included in a setting screen in another display method.

In the present exemplary embodiment, the communication apparatus 102 switches the display of at least one of an authentication method and an encryption method to the display including only supported methods, in accordance with a frequency band selected to be used, but the control is not limited to this. The communication apparatus 102 is only required to perform control in such a manner as to restrict a combination of a specific frequency band and a specific authentication method or a specific encryption method. Specifically, the communication apparatus 102 is only required to prevent an authentication method or an encryption method that is unsupported in a frequency band selected to be used, from being selected and set as a communication parameter. For example, whichever frequency band is selected, the communication apparatus 102 may display all of the options for at least one of an authentication method and an encryption method. In this case, the communication apparatus 102 notifies the user of an error when an authentication method or an encryption method that is unsupported in the frequency band to be used is selected. Alternatively, the communication apparatus 102 may notify the user of an error when a setting completion instruction is issued in a state in which an authentication method or an encryption method that is unsupported in the frequency band to be used is selected. Specifically, the error notification to the user refers to displaying a screen indicating an error, on a display unit (notification unit) of the communication apparatus 102. Alternatively, the communication apparatus 102 may notify the user of an error by reproducing error sound indicating the error, and outputting the error sound from a speaker (notification unit). In this case, the communication apparatus 102 may notify the user that the setting has no problem, in a case where at least one of an authentication method or an encryption method that is supported in a frequency band to be used is selected. Specifically, the communication apparatus 102 displays a screen indicating that the setting has no problem, on a display unit (notification unit). Alternatively, the communication apparatus 102 may notify the user by reproducing sound indicating that the setting has no problem, and outputting the sound from an output unit (notification unit). Alternatively, the communication apparatus 102 may notify the user of setting completion, in a case where a setting completion instruction is issued in a state in which at least one of an authentication method or an encryption method that is supported in a frequency band to be used is selected. Specifically, the communication apparatus 102 displays a screen indicating setting completion, on a display unit (notification unit). Alternatively, the communication apparatus 102 may notify the user by reproducing sound indicating setting completion, and outputting the sound from an output unit (notification unit).

Alternatively, the communication apparatus 102 may switch a frequency band to be displayed in a selectable state, in accordance with at least one of an authentication method or an encryption method that is selected to be used. Specifically, the communication apparatus 102 displays the 6 GHz band as a frequency band in a selectable state, in a case where the WPA3 or the Open that uses the OWE method is selected as an authentication method. In this case, the communication apparatus 102 may also display the 5 GHz band and the 2.4 GHz band as frequency bands in a selectable state. In contrast, the communication apparatus 102 displays the 5 GHz band and the 2.4 GHz band as frequency bands in a selectable state, in a case where the WPA, the WPA2, or the Open that does not use the OWE method is selected as an authentication method. In this case, the communication apparatus 102 hides the 6 GHz band or displays the 6 GHz band in an unselectable state by graying out the 6 GHz band. Similarly, the communication apparatus 102 displays the 6 GHz band as a frequency band in a selectable state, in a case where the AES is selected as an encryption method. In this case, the communication apparatus 102 may also display the 5 GHz band and the 2.4 GHz band as frequency bands in a selectable state. In contrast, in a case where the TKIP is selected as an encryption method, the communication apparatus 102 displays the 5 GHz band and the 2.4 GHz band as frequency bands in a selectable state, and hides the 6 GHz band or displays the 6 GHz band in an unselectable state by graying out the 6 GHz band.

In the present exemplary embodiment, at least a part of usable authentication methods are different between a case where communication is executed using the 2.4 GHz band or the 5 GHz band as a frequency band, and a case where communication is executed using the 6 GHz band as a frequency band, but the configuration is not limited to this. For example, at least either authentication methods or encryption methods supported in the 2.4 GHz band, the 5 GHz band, and the 6 GHz band may be different. In this case, the communication apparatus 102 may display only either authentication methods or encryption methods supported in the selected frequency band, on a setting screen of communication parameters, in accordance with a selected frequency band. Similar screen display may be also performed in a case where the communication apparatuses 102 and 103 can execute communication in a different frequency band in addition to or instead of the 2.4 GHz band, the 5 GHz band, and the 6 GHz band. Specifically, in accordance with a different frequency band having a supported authentication method different from those supported in the 2.4 GHz band, the 5 GHz band, and the 6 GHz band, being selected, only the authentication method supported in the communication in the different frequency band may be displayed on a setting screen. Similarly, regarding an encryption method, in a case where a supported encryption method is different from those supported in the 2.4 GHz band, the 5 GHz band, and the 6 GHz band, only the encryption method supported in the communication in the different frequency band may be displayed on a setting screen.

In the present exemplary embodiment, the communication apparatus 102 supports all of authentication methods including the Open, the WPA, the WPA2, and the WPA3 in the communication in the 2.4 GHz band and the 5 GHz band, but the configuration is not limited to this. At least any one of these authentication methods may be unsupported by the communication apparatus 102 in the communication in the 2.4 GHz band and the 5 GHz band. In this case, the communication apparatus 102 may avoid displaying an unsupported authentication method as a selectable option on the setting screens displayed when the 2.4 GHz band and the 5 GHz band are selected, among the setting screens described in the first to sixth display methods. For example, the communication apparatus 102 may hide an option including the WPA3, or may avoid displaying the option in a selectable state, in a case where the communication apparatus 102 does not support the WPA3 as an authentication method in the communication in the 2.4 GHz band and the 5 GHz band, on the setting screens illustrated in FIGS. 5 and 7.

In the present exemplary embodiment, the communication apparatus 102 supports the TKIP and the AES as encryption methods in the communication in the 2.4 GHz band and the 5 GHz band, but the configuration is not limited to this. The communication apparatus 102 needs not support the AES in the communication in the 2.4 GHz band and the 5 GHz band. In this case, the communication apparatus 102 may avoid displaying an unsupported encryption method as a selectable option on the setting screens displayed when the 2.4 GHz band and the 5 GHz band are selected, among the setting screens described in the first to sixth display methods.

In the present exemplary embodiment, the communication apparatus 102 performs communication complying with the IEEE 802.11ax standard, in the communication in the 2.4

GHz band, the 5 GHz band, and the 6 GHz band, but the standard is not limited to this. The communication apparatus 102 may perform communication complying with a different IEEE 802.11 series standard, in accordance with a frequency band. For example, the communication apparatus 102 may perform communication complying with the IEEE 802.11ax standard, as the communication in the 6 GHz band, and perform communication complying with the IEEE 802.11b standard, as the communication in the 2.4 GHz band. The communication apparatus 102 may perform communication complying with the IEEE 802.11g standard or the IEEE 802.11n standard, in place of the communication complying with the IEEE 802.11b standard. In this case, the communication apparatus 102 may perform communication complying with the IEEE 802.11a standard, the IEEE 802.11n standard, or the IEEE 802.11ac standard, as the communication in the 5 GHz band. The communication apparatus 102 may perform communication complying with the same communication standard, as communication in any two frequency bands.

In the present exemplary embodiment, communication parameters of the communication apparatus 102 are set via a setting screen, but a setting method is not limited to this. The communication parameters may be set via a system console. Specifically, the communication parameters may be set via a system console displayed on a display unit of the communication apparatus 102 or a display unit of another communication apparatus connecting via wired communication or wireless communication. By the user inputting a command for issuing an instruction of a wireless setting or a communication parameter, to the system console, the setting of communication parameters of the communication apparatus 102 is started. The command is a character string including numbers and characters. First of all, the user inputs a command for designating the 6 GHz band as a frequency band to be used, and thereby a frequency band to be used is set to the 6 GHz band. The command input at this time is a character string such as "set band ax6". Next, in a case where the user inputs a command for designating an authentication method unsupported in the communication in the 6 GHz band, as an authentication method to be used, the system console returns a response indicating that the designated authentication method is not settable. For example, in a case where the user inputs "set wpa_key_mgmt WPA-PSK" being a command for designating WPA-PSK as an authentication method, the system console outputs "NG". In contrast, in a case where the user inputs a command for designating an authentication method supported in the communication in the 6 GHz band, as an authentication method, the system console returns "OK" indicating that the designated authentication method is settable, as a response. The same applies to an encryption method. In a case where the user inputs a command for designating an encryption method unsupported in the 6 GHz band, the system console outputs a response indicating that the designated encryption method is not settable. In a case where the user inputs a command for designating an encryption method supported in the 6 GHz band, the system console outputs a response indicating that the designated encryption method is settable. Instead of a frequency band being designated in advance, an authentication method or an encryption method may be designated in advance by the user. In a case where the user inputs a command for designating the 6 GHz band as a frequency band to be used, in a state in which an authentication method or an encryption method that is unsupported in the 6 GHz band is designated by the user, the system console outputs a response indicating that the designated frequency band is not settable. In a case where the user inputs a command for designating the 6 GHz band as a frequency band to be used, in a state in which an authentication method or an encryption method that is supported in the 6 GHz band is designated by the user, the system console outputs a response indicating that the designated frequency band is settable. The communication apparatus 102 may be prevented from starting the operation as an AP, instead of or in addition to the output of a response indicating that the designated method or frequency band is not settable, in a case where the user inputs a command for issuing a start instruction of an operation as an AP. The command for starting an operation as an AP is "AP enable", for example. In a case where the communication apparatus 102 is not operated as an AP, the user may be notified of a cause thereof.

At least part or all of the processing to be executed by the communication apparatus 102 in the flowchart illustrated in FIG. 4 may be implemented by hardware. In a case where the processing is implemented by hardware, it is sufficient that a dedicated circuit is generated on a field programmable gate array (FPGA) from a computer program for implementing each step, by using a predetermined compiler, for example, and the dedicated circuit is used. A gate array circuit may be formed and implemented as hardware similarly to the FPGA. The processing may be implemented by an application specific integrated circuit (ASIC).

The present invention can also be implemented by processing of supplying a program for implementing one or more functions of the above-described exemplary embodiment, to a system or an apparatus via a network or a storage medium, and one or more processors in a computer of the system or the apparatus reading out the program and executing the program. The present invention can also be implemented by a circuit (i.e., ASIC) implementing one or more functions.

The present invention is not limited to the above-described exemplary embodiments, and various changes and modifications can be made within the spirit and scope of the present invention. Therefore, to apprise the public of the scope of the present invention, the following claims are made.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to an exemplary embodiment of the present invention, a combination of a frequency band and an authentication method can be appropriately set.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:
   at least one memory that stores a set of instructions; and
   at least one processor that executes the instructions, the instructions, when executed, causing the communication apparatus to perform operations comprising:
   selecting a frequency band to be used in a case where wireless communication complying with an Institute of Electrical and Electronics Engineers (IEEE) 802.11 series standard is executed;
   selecting an authentication method to be used in a case where wireless communication complying with an IEEE 802.11 series standard is executed; and
   performing a control to issue a notification to a user, in such a manner as to restrict a combination of the selection of a predetermined frequency band and the selection of a predetermined authentication method,
   wherein, in a case where the predetermined frequency band is selected, a control is performed not to display the predetermined authentication method in a selectable state, and to display another authentication method different from the predetermined authentication method in a selectable state, and
   wherein, in a case where a frequency band different from the predetermined frequency band is selected, a control is performed to display the predetermined authentication method in a selectable state.

2. The communication apparatus according to claim 1, wherein, even in a case where a frequency band different from the predetermined frequency band is selected, a control is performed to display the other authentication method in a selectable state.

3. The communication apparatus according to claim 1, wherein, in a case where the predetermined frequency band is selected, a control is performed to display the predetermined authentication method in a grayout state.

4. The communication apparatus according to claim 1, wherein, in a case where the predetermined frequency band is selected, a control is performed not to display the predetermined authentication method.

5. The communication apparatus according to claim 1, wherein, in a case where the predetermined frequency band is selected, a control is performed not to display a predetermined encryption method in a selectable state, and to display another encryption method different from the predetermined encryption method in a selectable state, and
   wherein, in a case where a frequency band different from the predetermined frequency band is selected, a control is performed to display the predetermined encryption method in a selectable state.

6. The communication apparatus according to claim 5, wherein, even in a case where a frequency band different from the predetermined frequency band is selected, a control is performed to display the other encryption method in a selectable state.

7. The communication apparatus according to claim 5, wherein the other encryption method is an Advanced Encryption Standard (AES).

8. The communication apparatus according to claim 5, wherein the predetermined encryption method is a Temporal Key Integrity Protocol (TKIP).

9. The communication apparatus according to claim 5, wherein, in a case where the predetermined frequency band is selected, a control is performed to display the predetermined encryption method in a grayout state.

10. The communication apparatus according to claim 5, wherein, in a case where the predetermined frequency band is selected, a control is performed not to display the predetermined encryption method.

11. The communication apparatus according to claim 1, wherein, in a case where the predetermined authentication method is selected, a control is performed not to display the predetermined frequency band in a selectable state, and to display a frequency band different from the predetermined frequency band in a selectable state, and
    wherein, in a case where another authentication method different from the predetermined authentication method is selected, a control is performed to display the predetermined frequency band in a selectable state.

12. The communication apparatus according to claim 11, wherein, even in a case where the other authentication method is selected, a control is performed to display a frequency band different from the predetermined frequency band in a selectable state.

13. The communication apparatus according to claim 11, wherein, in a case where the predetermined authentication method is selected, a control is performed to display the predetermined frequency band in a grayout state.

14. The communication apparatus according to claim 11, wherein, in a case where the predetermined authentication method is selected, a control is performed not to display the predetermined frequency band.

15. The communication apparatus according to claim 11, wherein the instructions further cause the communication apparatus to select an encryption method to be used in a case where wireless communication complying with an IEEE 802.11 series standard is executed,
    wherein, in a case where a predetermined encryption method is selected, a control is performed not to display the predetermined frequency band in a selectable state, and to display a frequency band different from the predetermined frequency band in a selectable state, and
    wherein, in a case where another encryption method different from the predetermined encryption method is selected, a control is performed to display the predetermined frequency band in a selectable state.

16. The communication apparatus according to claim 15, wherein, even in a case where the other encryption method is selected, a control is performed to display a frequency band different from the predetermined frequency band in a selectable state.

17. The communication apparatus according to claim 15, wherein the other encryption method is an AES.

18. The communication apparatus according to claim 15, wherein the predetermined encryption method is a TKIP.

19. The communication apparatus according to claim 15, wherein, in a case where the predetermined encryption method is selected, a control is performed to display the predetermined frequency band in a grayout state.

20. The communication apparatus according to claim 15, wherein, in a case where the predetermined encryption method is selected, a control is performed not to display the predetermined frequency band.

21. The communication apparatus according to claim 1, wherein, in a case where the predetermined frequency band is selected and the predetermined authentication method is selected, a control is performed to notify a user of an error.

22. The communication apparatus according to claim 21, wherein, in a case where the predetermined frequency band is selected and another authentication method different from the predetermined authentication method is selected, or in a case where a frequency band different from the predetermined frequency band is selected and the predetermined authentication method or the other authentication method is selected, a control is performed to notify a user that a setting has no problem.

23. The communication apparatus according to claim 21, wherein the instructions further cause the communication apparatus to select an encryption method to be used in a case where wireless communication complying with an IEEE 802.11 series standard is executed,
wherein, in a case where the predetermined frequency band is selected and a predetermined encryption method is selected, a control is performed to notify a user of an error.

24. The communication apparatus according to claim 23, wherein, in a case where the predetermined frequency band is selected and another encryption method different from the predetermined encryption method is selected, or in a case where a frequency band different from the predetermined frequency band is selected and the predetermined encryption method or the other encryption method is selected, a control is performed to notify a user that a setting has no problem.

25. The communication apparatus according to claim 24, wherein the other encryption method is an AES.

26. The communication apparatus according to claim 23, wherein the predetermined encryption method is a TKIP.

27. The communication apparatus according to claim 21, wherein a control is performed to notify a user of an error by outputting error sound for error notification.

28. The communication apparatus according to claim 21, wherein a control is performed to notify a user of an error by displaying a screen for error notification.

29. The communication apparatus according to claim 20, wherein the other authentication method is at least any one authentication method of Wi-Fi Protected Access (WPA)3, and Open that uses an Opportunistic Wireless Encryption (OWE) method as a key sharing method.

30. The communication apparatus according to claim 1, wherein a frequency band different from the predetermined frequency band is a 2.4 gigahertz (GHz) band or a 5 GHz band.

31. The communication apparatus according to claim 1, wherein the predetermined authentication method is at least any one authentication method of Open that does not use an OWE method as a key sharing method, WPA, and WPA2.

32. The communication apparatus according to claim 1, wherein the predetermined frequency band is a 6 GHz band.

33. The communication apparatus according to claim 1, wherein a control is performed to issue a notification using a notification unit included in the communication apparatus.

34. The communication apparatus according to claim 1, wherein a control is performed to issue a notification and performing a control to display using a display unit included in another communication apparatus communicating with the communication apparatus via a cable or wirelessly.

35. A control method of a communication apparatus, the control method comprising:
first selecting of selecting a frequency band to be used in a case where wireless communication complying with an IEEE 802.11 series standard is executed;
second selecting of selecting an authentication method to be used in a case where wireless communication complying with an IEEE 802.11 series standard is executed; and
performing a control to issue a notification to a user, in such a manner as to restrict a combination of selection of a predetermined frequency band that is made in the first selecting, and selection of a predetermined authentication method that is made in the second selecting,
wherein, in a case where the predetermined frequency band is selected by the first selecting, a control is performed not to display the predetermined authentication method in a selectable state, and to display another authentication method different from the predetermined authentication method in a selectable state, and
wherein, in a case where a frequency band different from the predetermined frequency band is selected by the first selecting, a control is performed to display the predetermined authentication method in a selectable state.

36. A non-transitory computer-readable storage medium storing a program for causing a computer to execute a control method of a communication apparatus, the control method comprising:
first selecting of selecting a frequency band to be used in a case where wireless communication complying with an IEEE 802.11 series standard is executed;
second selecting of selecting an authentication method to be used in a case where wireless communication complying with an IEEE 802.11 series standard is executed; and
performing a control to issue a notification to a user, in such a manner as to restrict a combination of selection of a predetermined frequency band that is made in the first selecting, and selection of a predetermined authentication method that is made in the second selecting,
wherein, in a case where the predetermined frequency band is selected by the first selecting, a control is performed not to display the predetermined authentication method in a selectable state, and to display another authentication method different from the predetermined authentication method in a selectable state, and
wherein, in a case where a frequency band different from the predetermined frequency band is selected by the first selecting, a control is performed to display the predetermined authentication method in a selectable state.

* * * * *